US012072647B2

(12) United States Patent
Hamano

(10) Patent No.: US 12,072,647 B2
(45) Date of Patent: Aug. 27, 2024

(54) IMAGE FORMING APPARATUS HAVING CONTROLLER TO CONTROL MOVEMENT OF PRESSING MEMBER FOR PRESSING THE INNER SURFACE OF TRANSFER BELT

(71) Applicant: CANON KABUSHIKI KAISHA, Tokyo (JP)

(72) Inventor: Akira Hamano, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/127,267

(22) Filed: Mar. 28, 2023

(65) Prior Publication Data

US 2023/0314981 A1 Oct. 5, 2023

(30) Foreign Application Priority Data

Mar. 29, 2022 (JP) ................................ 2022-054621

(51) Int. Cl.
*G03G 15/16* (2006.01)
*G03G 15/00* (2006.01)
*G03G 15/04* (2006.01)
*G03G 15/08* (2006.01)

(52) U.S. Cl.
CPC ..... *G03G 15/1605* (2013.01); *G03G 15/1615* (2013.01); *G03G 15/04036* (2013.01); *G03G 15/0806* (2013.01); *G03G 15/5008* (2013.01); *G03G 2215/00784* (2013.01); *G03G 2215/0446* (2013.01)

(58) Field of Classification Search
CPC ............ G03G 15/041; G03G 15/1605; G03G 15/161; G03G 15/6594; G03G 2215/00784; G03G 2215/0446
USPC ............................ 399/45, 66, 196, 302, 308
See application file for complete search history.

(56) References Cited

U.S. PATENT DOCUMENTS

| | | | | |
|---|---|---|---|---|
| 11,347,165 B2 | 5/2022 | Kakehi et al. | | |
| 2012/0114397 A1* | 5/2012 | Hanatani | ............ | G03G 15/1615 399/302 |
| 2015/0309448 A1* | 10/2015 | Kakehi | ............. | G03G 15/1605 399/313 |
| 2015/0309449 A1 | 10/2015 | Kakehi | | |
| 2021/0356886 A1* | 11/2021 | Tajima | ............... | G03G 15/0189 |

(Continued)

FOREIGN PATENT DOCUMENTS

| | | | |
|---|---|---|---|
| CN | 106227010 A * | 12/2016 | ......... G03G 15/1605 |
| JP | 9-80926 A | 3/1997 | |

(Continued)

*Primary Examiner* — Robert B Beatty
(74) *Attorney, Agent, or Firm* — Venable LLP

(57) ABSTRACT

An image forming apparatus includes an image forming portion, a rotatable endless belt, a plurality of stretching rollers including an inner roller and an upstream roller; an outer member, a pressing member, a moving mechanism; and a control portion. The moving mechanism is capable of changing a pressing amount of the pressing member to the belt or a contacting and separating state of the pressing member to the belt by changing a position of the pressing member. The control portion controls magnification of a toner image, to be formed on the belt by the image forming portion, with respect to a conveyance direction of the belt based on a position of the pressing member by the moving mechanism while the toner image is transferred to the recording material from the belt.

17 Claims, 10 Drawing Sheets

(56) References Cited

U.S. PATENT DOCUMENTS

| | | | | |
|---|---|---|---|---|
| 2022/0187740 | A1* | 6/2022 | Matsuura | G03G 15/161 |
| 2022/0197201 | A1* | 6/2022 | Kitago | G03G 15/6594 |

FOREIGN PATENT DOCUMENTS

| | | | | | |
|---|---|---|---|---|---|
| JP | 2002-268297 | A | | 9/2002 | |
| JP | 2015-215594 | A | | 12/2015 | |
| JP | 2016-133544 | A | | 7/2016 | |
| JP | 2019086552 | A | * | 6/2019 | G03G 15/0189 |
| JP | 6552294 | B2 | * | 7/2019 | G03G 15/00 |
| JP | 2021-196587 | A | | 12/2021 | |

* cited by examiner

IMAGE FORMING APPARATUS HAVING CONTROLLER TO CONTROL MOVEMENT OF PRESSING MEMBER FOR PRESSING THE INNER SURFACE OF TRANSFER BELT

FIELD OF THE INVENTION AND RELATED ART

The present invention relates to an image forming apparatus such as a printer, printing machine, copier, facsimile machine, or a multifunctional machine having more than one of these functions, using electrophotographic method or electrostatic recording method.

Conventionally, the image forming apparatus using electrophotographic method, etc., has a rotatable endless belt (hereinafter simply referred to as "belt") as an image bearing member that bears and conveys a toner image. Such a belt includes, for example, an intermediary transfer belt as a secondary image bearing member that conveys a toner image that is primary transferred from a photosensitive member, etc. as the first image bearing member for secondary transfer to a sheet-like recording material such as a sheet of paper. The following description will mainly take as an example the image forming apparatus employing an intermediary transfer method including the intermediary transfer belt.

In the image forming apparatus using the intermediary transfer belt, the toner image formed on the photosensitive member, etc., in an image forming portion is primary transferred to the intermediary transfer belt in a primary transfer portion. In addition, the toner image that is primary transferred to the intermediary transfer belt is secondary transferred to the recording material in a secondary transfer portion. The secondary transfer portion, which is a contact portion between the intermediary transfer belt and an outer member, is formed by an inner member (secondary transfer inner member) provided on an inner circumferential surface side of the intermediary transfer belt and the outer member (secondary transfer outer member) provided on an outer circumferential surface side of the intermediary transfer belt. As the inner member, a secondary transfer inner roller, which is one of a plurality of stretching rollers that stretch the intermediary transfer belt, is used. As the outer member, a secondary transfer outer roller is often used, which is positioned opposite to the secondary transfer inner roller across the intermediary transfer belt and pressed toward the secondary transfer inner roller. Then, the toner image on the intermediary transfer belt is secondarily transferred onto the recording material in the secondary transfer portion by applying a voltage of opposite polarity against a charging polarity of the toner to the secondary transfer outer roller (or a voltage of the same polarity as the charging polarity of the toner to the secondary transfer inner roller). Incidentally, for the recording material, a "leading end" and a "trailing end" refer to the leading end and the trailing end of the recording material along with a feeding direction of the recording material, respectively. In addition, an upstream of the secondary transfer portion with respect to a rotational direction of the intermediary transfer belt (moving direction of a surface) is simply referred to as "upstream of the secondary transfer portion," etc.

In order to transfer the toner image formed on the intermediary transfer belt to the recording material with high accuracy, a contact length between the intermediary transfer belt and the recording material in the rotational direction of the intermediary transfer belt upstream of the secondary transfer portion is important. If the contact length is long, image defects may occur due to sliding between the toner and the recording material because of a difference of a speed between the intermediary transfer belt and the recording material. On the other hand, if the contact length is short, image defects may occur due to electrical discharges that occur in an air gap between the recording material and the intermediary transfer belt. Therefore, a posture of the recording material when conveyed and a layout of a stretch of the intermediary transfer belt are determined in consideration of a contact position of the leading edge of the recording material to the intermediary transfer belt upstream of the secondary transfer portion, etc.

On the other hand, in recent years, for example, with the diversification of recording materials in the commercial printing market, there is a demand for good transfer on a wide variety of recording materials, from thick paper with high rigidity to thin paper with low rigidity. For example, when recording materials with high rigidity, such as thick paper, are used, the intermediary transfer belt is easily deformed when the recording material enters the contact position mentioned above. As a result, a small air gap is formed between the intermediary transfer belt and the recording material upstream of the secondary transfer portion, and image defects due to electrical discharge in the air gap may occur. Therefore, it is necessary to suppress the deformation of the intermediary transfer belt upstream of the secondary transfer portion and to form a desired shape (posture) of the intermediary transfer belt upstream of the secondary transfer portion with high accuracy.

In the Japanese Patent Laid-Open No. H09-80926, a configuration is proposed, in which a flatness correcting member is provided upstream of the contact position (tacking position) of the leading edge of the recording material to the intermediary transfer belt with respect to the rotational direction of the intermediary transfer belt, which contacts the inner circumferential surface of the intermediary transfer belt to press the intermediary transfer belt. In the patent document mentioned above, as the flatness correcting member, a flexible baffle plate or an elastic roll is used.

In addition, in the Japanese Laid-Open Patent Application No. 2015-215594, a configuration that changes a pressing amount on the intermediary transfer belt of a pressing member that contacts the inner circumferential surface of the intermediary transfer belt and presses the intermediary transfer belt, depending on the type of recording material is proposed.

However, by changing a position of the pressing member (backup member) that contacts the inner circumferential surface of the intermediary transfer belt upstream of the secondary transfer portion according to the recording material, a curvature of a surface (a surface of a side which contacts the recording material, the outer circumferential surface) of the intermediary transfer belt upstream of the secondary transfer portion changes. The surface speed (a moving speed of the outer circumferential surface) of the intermediary transfer belt changes slightly under an influence of this curvature change.

As a result, the speed of the recording material in the secondary transfer portion (a moving speed of a surface which contacts with the intermediary transfer belt) may change, and an image elongation (overall magnification) in a conveyance direction of the recording material may change. This discrepancy (offset) in the image elongation (overall magnification) in the conveyance direction of the recording material becomes apparent, for example, as front-to-back registration misalignment (misalignment of printing positions of the front and back sides of the recording material) in a double-side printing, which leads to a deterioration in image quality.

Incidentally, so far, the description of the conventional problems took as an example the secondary transfer portion, which is the transfer portion of the toner image from the intermediary transfer belt to the recording material, but the same problems can arise in the transfer portion of the toner image from other belt-shaped image bearing members, such as photosensitive members, to the recording material.

SUMMARY OF THE INVENTION

Therefore, a purpose of the present invention is to suppress changes in the image elongation with respect to the conveyance direction of the recording material by changing the position of the pressing member that contacts the inner circumferential surface of the belt upstream of the transfer portion.

The purpose mentioned above is achieved with the image forming apparatus of the present invention. In summary, the invention is an image forming apparatus comprising an image forming portion configured to form a toner image, a rotatable endless belt configured to bear the toner image formed by the image forming portion, a plurality of stretching rollers configured to stretch the belt, and including an inner roller and an upstream roller disposed upstream of and adjacent to the inner roller with respect to a rotational direction of the belt, an outer member disposed opposite to the inner roller via the belt and configured to form a transfer portion transferring the toner image to a recording material from the belt by contacting an outer circumferential surface, a pressing member contactable to an inner circumferential surface of the belt upstream of the inner roller and downstream of the upstream roller with respect to the rotational direction of the belt and capable of pressing the belt toward an outer circumferential surface side from an inner circumferential surface side, a moving mechanism capable of changing a pressing amount of the pressing member to the belt or a contacting and separating state of the pressing member to the belt by changing a position of the pressing member, and a control portion configured to control magnification of the toner image, to be formed on the belt by the image forming portion, with respect to a conveyance direction of the belt based on the position of the pressing member by the moving mechanism while the toner image is transferred to the recording material from the belt.

Further features of the present invention will become apparent from the following description of exemplary embodiments with reference to the attached drawings.

DESCRIPTION OF THE EMBODIMENTS

In the following, a more detailed description of an image forming apparatus of the present invention is disclosed in accordance with the drawings.

Embodiment 1

1. Overall Configuration and Operation of the Image Forming Apparatus

Figure 1:
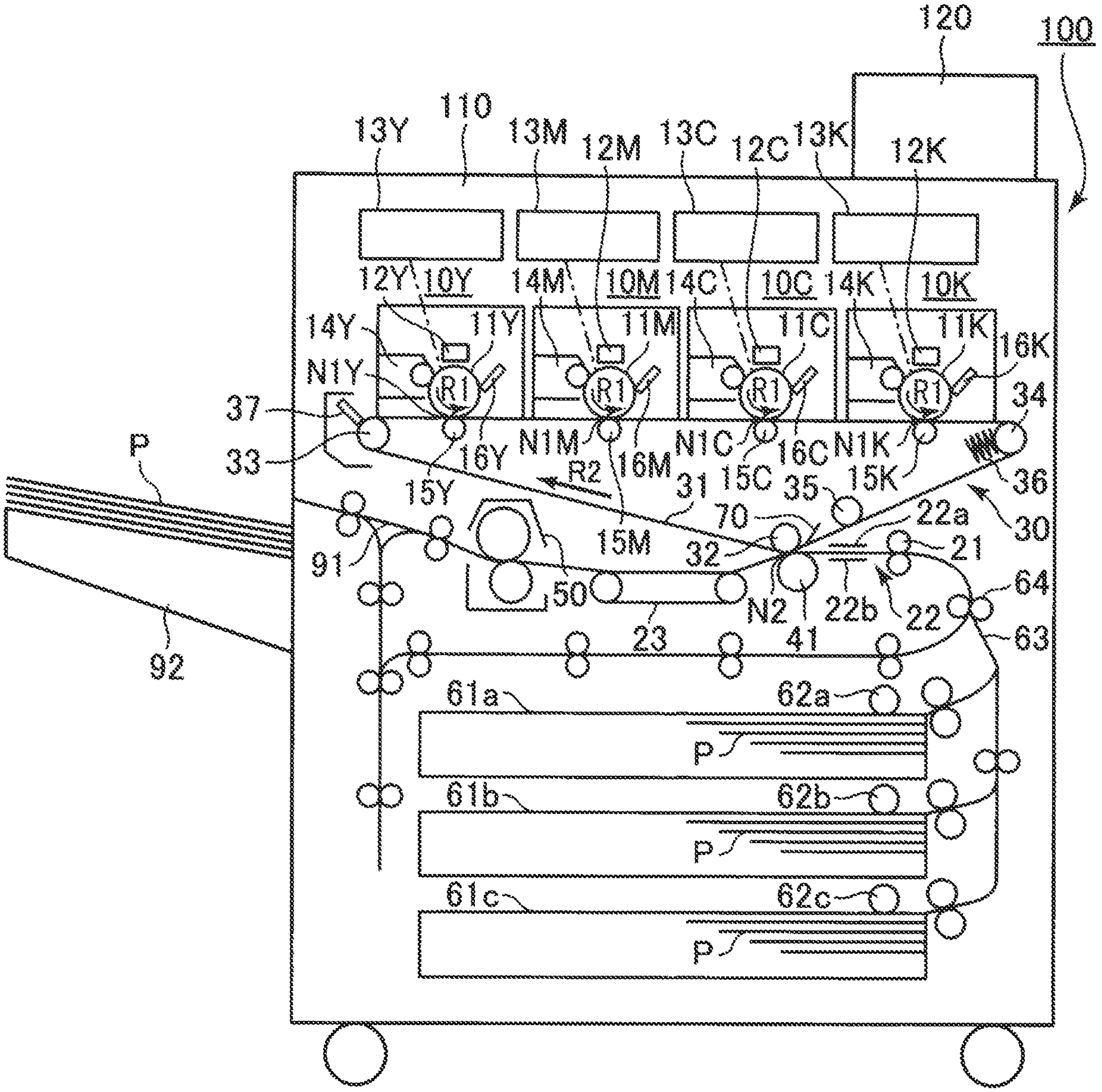
FIG. 1 is a schematic cross-sectional view of an image forming apparatus.

FIG. 1 is a schematic cross-sectional view of the image forming apparatus 100 of the embodiment 1. The image forming apparatus 100 in the embodiment 1 is a tandem-type printer employing an intermediary transfer method. The image forming apparatus 100 can form a full-color image on sheet-like recording material (transfer material, sheet, recording medium, media) P such as a sheet of paper using an electrophotographic method in response to an image signal transmitted from an external device such as a personal computer, for example.

The image forming apparatus 100 includes four image forming portions 10Y, 10M, 10C, and 10K that form yellow (Y), magenta (M), cyan (C), and black (K) images, respectively, as multiple image forming portions (stations). These image forming portions 10Y, 10M, 10C, and 10K are arranged in a row along a moving direction of an image transfer surface which is arranged substantially horizontal to an intermediary transfer belt 31 as described below. Elements having the same or corresponding functions or configuration in each of the image forming portions 10Y, 10M, 10C, and 10K may be described in general terms by omitting Y, M, C, and K at the end of the reference numeral indicating that the element is for one of the colors. In the embodiment 1, the image forming portion 10 is configured to include a photosensitive drum 11 (11Y, 11M, 11C, 11K), a charger 12 (12Y, 12M, 12C, 12K), an exposure device 13 (13Y, 13M, 13C, 13K), a developing unit 14 (14Y, 14M, 14C, 14K), a primary transfer roller 15 (15Y, 15M, 15C, 15K), and a cleaning device 16 (16Y, 16M, 16C, 16K) as described below.

The image forming apparatus 100 includes the photosensitive drum 11, which is a rotatable drum-type (cylindrical) photosensitive member (electrophotographic photosensitive member), as a first image bearing member that bears a toner image. The photosensitive drum 11 is driven by a driving force transmitted from a drum driving motor (not shown) as a driving source and rotated in a direction of the arrow R1 (counterclockwise direction) in FIG. 1 at a predetermined circumferential speed (process speed). A surface of the rotating photosensitive drum 11 is uniformly charged to a predetermined electric potential of a predetermined polarity (negative polarity in the embodiment 1) by the charger 12 as a charging means. During the charging process, a predetermined charging voltage (charging bias) is applied to the charger 12 by a charging voltage source (not shown).

The surface of the electrically charged photosensitive drum 11 is scanned and exposed according to an image signal by the exposure device 13 as an exposure means, and an electrostatic image (electrostatic latent image) is formed on the photosensitive drum 11. In the embodiment 1, the exposure device 13 comprises a laser scanner device which irradiates a laser beam modulated according to the image signal (image information) onto the photosensitive drum 11 via a polygon mirror.

In other words, in the embodiment 1, the exposure device 13 is configured to include a laser driver 131 (FIG. 10), a laser diode (not shown), a polygon mirror 13*a* (FIG. 10), a polygon motor 204 (FIG. 10), an optical lens system (not shown), etc. The exposure device 13 reflects the laser beam from the laser diode as a light source toward the photosensitive drum 11 by the polygon mirror 13*a* as a laser scanning portion, which is rotated and driven by the polygon motor 204 as a driving source. As a result, the laser beam is scanned in a main scan direction, which is a direction that is substantially parallel to a rotation axis direction of the photosensitive drum 11 (a direction that is substantially perpendicular to a moving direction of the surface of the photosensitive drum 11). In addition, the exposure device 13 scans the laser beam in a sub-scan direction, which is substantially parallel to the moving direction of the surface of the photosensitive drum 11, along with a rotation of the photosensitive drum 11. The electrostatic image formed on the photosensitive drum 11 is developed (visualized) by supplying toner as a developing agent by the developing unit 14 as a developing means, and the toner image (toner figure, developer image) is formed on the photosensitive drum 11. In the embodiment 1, the toner charged with the same polarity as that of the photosensitive drum 11 (negative polarity in the embodiment 1) is adhered to an exposure portion (image portion) on the photosensitive drum 11, where an absolute electric potential has decreased due to exposure after being uniformly charged (reverse development method). During development, a predetermined developing voltage (developing bias) is applied to a developing roller as a developer bearing member of the developing unit 14 by a developing power supply (not shown). In the embodiment 1, a normal charging polarity of the toner, which is a main charging polarity of the toner during development, is negative polarity.

The intermediary transfer belt 31, which is a rotatable intermediary transfer member being constituted of an endless belt, as a second image bearing member that bears the toner image is arranged as being opposed to the four photosensitive drums 11Y, 11M, 11C, and 11K. The intermediary transfer belt 31 is extended around a driving roller 33, a tension roller 34, a pre-secondary transfer roller 35, and a secondary transfer inner roller 32 as a plurality of tension rollers (support rollers) and is stretched with a predetermined tension (tensile strength). The driving roller 33 transmits driving force to the intermediary transfer belt 31. The driving roller 33 is rotated and driven by the driving force transmitted from a belt driving motor (belt driving portion) 201 (FIG. 10) as a driving source. As a result, the intermediary transfer belt 31 rotates (circulates) in the direction of arrow R2 (clockwise direction) in FIG. 1 at the circumferential speed (process speed) corresponding to the circumferential speed of the photosensitive drum 11 as the driving force is input by the driving roller 33. The tension roller 34 applies a predetermined tension to the intermediary transfer belt 31 and controls the tension of the intermediary transfer belt 31 to a constant level. The tension roller 34 is urged toward the outer circumferential side of the intermediary transfer belt 31 from the inner circumferential side by a tension spring 36 which is constituted of a compressed coil spring, which is an urging member as a tension applying means (urging means), at both end portions in the rotation axis direction of the tension roller 34. The pre-secondary transfer roller 35 forms a surface of the intermediary transfer belt 31 near the upstream of the secondary transfer portion N2 (described below) with respect to the rotational direction (moving direction of the surface) of the intermediary transfer belt 31. The secondary transfer inner roller (inner member) 32 functions as a secondary transfer member as a secondary transfer means in the embodiment 1. In addition, primary transfer rollers 15Y, 15M, 15C, 15K, which are roller-shaped primary transfer members as primary transfer means, are arranged on the inner circumferential surface side of intermediary transfer belt 31, corresponding to each photosensitive drum 11Y, 11M, 11C, 11K. In the embodiment 1, the primary transfer roller 15 is arranged at a position opposing to the photosensitive drum 11 via the intermediary transfer belt 31. The primary transfer roller 15 presses the intermediary transfer belt 31 toward the photosensitive drum 11 and forms the primary transfer portion (primary transfer nip) N1, which is a contact portion between the photosensitive drum 11 and the intermediary transfer belt 31. The stretching rollers other than the driving roller 33 among the plurality of stretching rollers and each of the primary transfer rollers 15 are driven by and rotate with the rotation of the intermediary transfer belt 31. In addition, on the inner circumferential surface side of the intermediary transfer belt 31, a pressing member 70 is provided upstream from the secondary transfer inner roller 32 and downstream from the pre-secondary transfer roller 35 with respect to the rotational direction of the intermediary transfer belt 31. The pressing member 70 and a moving mechanism 71 (FIG. 3) for changing a position of the pressing member 70 are described in detail below.

The toner image formed on the photosensitive drum 11 as described above is primary transferred onto the rotating intermediary transfer belt 31 at a primary transfer portion N1. During the primary transfer, a primary transfer voltage (primary transfer bias), which is a DC voltage of the opposite polarity to the normal charging polarity of the toner (positive polarity in the embodiment 1), is applied to the primary transfer roller 15 by a primary transfer power source (not shown). For example, when forming a full-color image, the yellow, magenta, cyan, and black toner images formed on each photosensitive drums 11 are sequentially primary transferred so that they are superimposed on the same image forming area on the intermediary transfer belt 31. In the embodiment 1, the primary transfer portion N1 is an image forming position where the toner image is formed on the intermediary transfer belt 31. And the intermediary transfer belt 31 is an example of a rotatable endless belt that conveys the toner image borne at the image forming position.

On the outer circumferential side of the intermediary transfer belt 31, a secondary transfer outer roller (outer member) 41 is arranged opposite to the secondary transfer inner roller 32. The secondary transfer outer roller 41 functions as an opposing member (opposing electrode) of the secondary transfer inner roller 32 in the embodiment 1. The secondary transfer outer roller 41 is pressed toward the secondary transfer inner roller 32 via the intermediary transfer belt 31 to form the secondary transfer portion (secondary transfer nip) N2, which is a contact area between the intermediary transfer belt 31 and the secondary transfer outer roller 41. In the embodiment 1, the secondary transfer outer roller 41 is driven and rotated by the driving force transmitted from an outer roller driving motor (outer member driving portion) 202 (FIG. 10) as a driving source. The toner image formed on the intermediary transfer belt 31 as described above is secondarily transferred in the secondary transfer portion N2 onto the recording material P being nipped and conveyed by the intermediary transfer belt 31 and the secondary transfer outer roller 41. In the embodiment 1, during the secondary transfer, a secondary transfer voltage (secondary transfer bias), which is a DC voltage of the same polarity as the normal charging polarity of the toner (negative polarity in the embodiment 1), is applied to the secondary transfer inner roller 32 by a secondary transfer power source (not shown). In the embodiment 1, the secondary transfer outer roller 41 is electrically grounded (connected to ground). Incidentally, the secondary transfer outer roller 41 may be used as the secondary transfer member and the secondary transfer voltage of the opposite polarity to the normal charging polarity of the toner may be applied to the secondary transfer outer roller 41, and the secondary transfer inner roller 32 may be used as the opposing electrode and be electrically grounded.

Recording material P is accommodated in recording material cassettes 61*a*, 61*b* and 61*c* as recording material accommodating portions. The recording material P accommodated in the recording material cassettes 61*a*, 61*b* and 61*c* is fed into a feed conveying passage 63 by rotating and driving one of feeding rollers 62*a*, 62*b* and 62*c*, which are feeding members as feeding means. The recording material P is conveyed to a registration roller pair 21, which is a conveyance member as a conveyance means, by a conveyance roller pair 64, etc., which is a conveyance member as a conveyance means and is stopped once. The recording material Pis nipped and conveyed by the registration roller pair 21 by rotating and driving the registration roller pair 21 and is conveyed into the secondary transfer portion N2 in timing with the toner image on the intermediary transfer belt 31. At least one of the pair of rollers constituting the registration roller pair 21 is driven and rotated by a driving force transmitted from a resist driving motor 203 (FIG. 10) as a driving source.

Downstream from the registration roller pair 21 and upstream from the secondary transfer portion N2 with respect to a conveyance direction of the recording material P, a conveyance guide (pre-transfer guide) 22 is provided to guide the recording material P to the secondary transfer portion N2. The transfer guide 22 is configured to include a first guide member 22*a* that can contact a front surface of the recording material P (a surface on which the toner image is transferred immediately after passing through the transfer guide 22) and a second guide member 22*b* that can contact a rear surface of the recording material P (the opposite side of the front surface). The first guide member 22*a* and the second guide member 22*b* are arranged facing each other, and the recording material P passes between these two members. The first guide member 22*a* restricts a movement of the recording material P toward the intermediary transfer belt 31. The second guide member 22*b* restricts a movement of the recording material P away from the intermediary transfer belt 31.

The recording material P onto which the toner image is transferred is conveyed by a conveyance belt (pre-fixing conveyance device) 23, etc., to a fixing device 50 as a fixing means. The fixing device 50 fixes (melts and adheres) the toner image to the surface of the recording material P by heating and pressurizing the recording material P carrying an unfixed toner image by nipping and conveying the recording material P by fixing rotatable member pairs. The recording material P onto which the toner image is fixed is discharged (output) through a discharge conveyance path 91 to a discharge tray 92 provided outside of a main assembly 110 of the image forming apparatus 100 (outside of the apparatus).

On the other hand, adhered materials such as toner remaining on photosensitive drum 11 after the primary transfer (primary transfer residual toner) are removed from photosensitive drum 11 and collected by the cleaning device 16 as a cleaning means. In addition, adhered materials such as toner remaining on the intermediary transfer belt 31 after the secondary transfer (secondary transfer residual toner) are removed from the intermediary transfer belt 31 and collected by a belt cleaning device 37 as an intermediary transfer member cleaning means.

Incidentally, in the embodiment 1, an intermediary transfer belt unit 30 as a belt conveyance device is configured to include the intermediary transfer belt 31, each of the stretch rollers 32 to 35, each of the primary transfer rollers 15, the belt cleaning device 37, and a frame (not shown) to support these components. In the embodiment 1, the intermediary transfer belt unit 30 further includes the pressing member 70 and the moving mechanism 71 (FIG. 3) for changing the position of this pressing member 70. The intermediary transfer belt unit 30 is attachable to and detachable (or withdrawable) from the main assembly 110 of the image forming apparatus 100 for maintenance or replacement.

Here, the intermediary transfer belt 31 can be made of a single or multi-layered resin-based material, or a multi-layered structure with a resin layer made of a resin material and an elastic layer made of an elastic material. In addition, in the embodiment 1, the secondary transfer inner roller 32 is constituted of an elastic layer of electronically conductive rubber on an outer circumference of a core metal made of a metal (core member). In addition, in the embodiment 1, the pre-secondary transfer roller 35 is constituted of a metal roller. In addition, in the embodiment 1, the secondary transfer outer roller 41 is constituted of an elastic layer of ion-conductive foam rubber on an outer circumference of the core metal made of a metal (core member). In addition, in the embodiment 1, a bearing member (not shown) that supports both ends of the secondary transfer outer roller 41 in a rotation axis direction can slide in a direction toward the secondary transfer inner roller 32 and in the opposite direction. The bearing member is pressed toward the secondary transfer inner roller 32 by a pressing spring 42 (FIG. 2) constituted of a compressed coil spring which is an urging member (elastic member) as an urging means. As a result, the secondary transfer outer roller 41 contacts the secondary transfer inner roller 32 with a predetermined pressure across the intermediary transfer belt 31 and form the secondary transfer portion N2. In the embodiment 1, a hardness of the secondary transfer inner roller 32 (more specifically, the hardness of the elastic layer) is higher than that of the secondary transfer outer roller 41 (more specifically, the hardness of the elastic layer). For example, the hardness of the elastic layer of the secondary transfer inner roller 32 is set at about 70° (UIS-A), and the hardness of the elastic layer of the secondary transfer outer roller 41 is set at about 28° (ASCAR C). The secondary transfer inner roller 32 may be constituted of a metal roller. Incidentally, each of the rotation axis directions of the stretching rollers of the intermediary transfer belt 31, including the secondary transfer inner roller 32, and the secondary transfer outer roller 41 are substantially parallel to each other.

2. Secondary Transfer Portion

Figure 2:
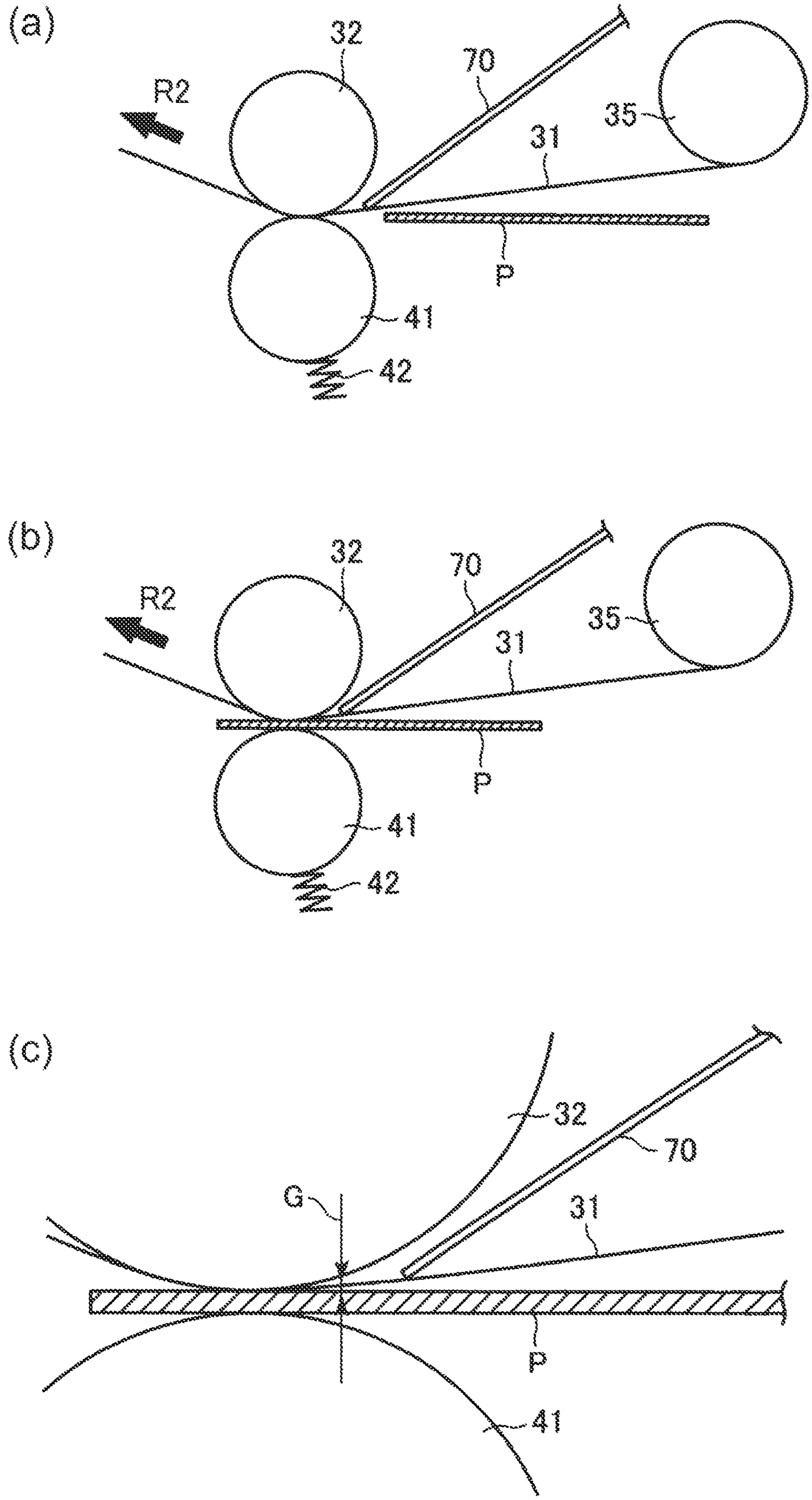
FIG. 2, part (a), part (b) and part (c), illustrates schematic cross-sectional views of a vicinity of a secondary transfer portion.

FIG. 2 is a schematic cross-sectional view (cross-section substantially perpendicular to the rotation axis direction of the secondary transfer inner roller 32) to explain a shape (posture) of the intermediary transfer belt 31 upstream of the secondary transfer portion N2 in the image forming apparatus 100 in the embodiment 1. FIG. 2(*a*) illustrates a state before the recording material P moves to the secondary transfer portion N2, FIG. 2(*b*) illustrates a state after the recording material P moves to the secondary transfer portion N2, and FIG. 2(*c*) illustrates an enlarged vicinity of the secondary transfer portion N2 in FIG. 2(*b*).

As shown in FIG. 2, in the embodiment 1, the secondary transfer outer roller 41 is elastically urged by the pressing spring 42 toward the secondary transfer inner roller 32 against the shape of the intermediary transfer belt 31 formed by being stretched by the secondary transfer inner roller 32 and the pre-secondary transfer roller 35. As a result, the intermediary transfer belt 31 is nipped by the secondary transfer inner roller 32 and the secondary transfer outer roller 41 to form the secondary transfer portion N2.

In addition, in the embodiment 1, the pressing member (backup member) 70 is provided upstream of the secondary transfer portion N2 in proximity to the secondary transfer inner roller 32. In the embodiment 1, during image formation (during secondary transfer), a tip of the pressing member 70 and the inner circumferential surface of the intermediary transfer belt 31 are made to be in a state of contact. The pressing member 70 can contact the inner circumferential surface of the intermediary transfer belt 31 and press the intermediary transfer belt 31 from the inner circumferential surface side to the outer circumferential surface side. As a result, the pressing member 70 can cause a tension surface of the intermediary transfer belt 31 formed between the secondary transfer inner roller 32 and the pre-secondary transfer roller 35 to stretch out from the inner circumferential side to the outer circumferential side of the intermediary transfer belt 31. In the embodiment 1, the pressing member 70 is formed of a flexible resin plate member, and the pressing member 70 uses flex elasticity to urge the intermediary transfer belt 31. Therefore, a shape (flexible volume, amount of deformation) or position of the pressing member 70 is determined to be a shape (or position) that balances between an urging force which the urging member 70 applies to the intermediary transfer belt 31 and a resistance force generated by the tension of the intermediary transfer belt 31. Here, the shape (or position) of the pressing member 70 determined in this way is also referred to as the "static shape (or static position). The shape (or posture) of the intermediary transfer belt 31 upstream of the secondary transfer portion N2 is formed by the static shape (or static position) of the pressing member 70.

Figure 3:
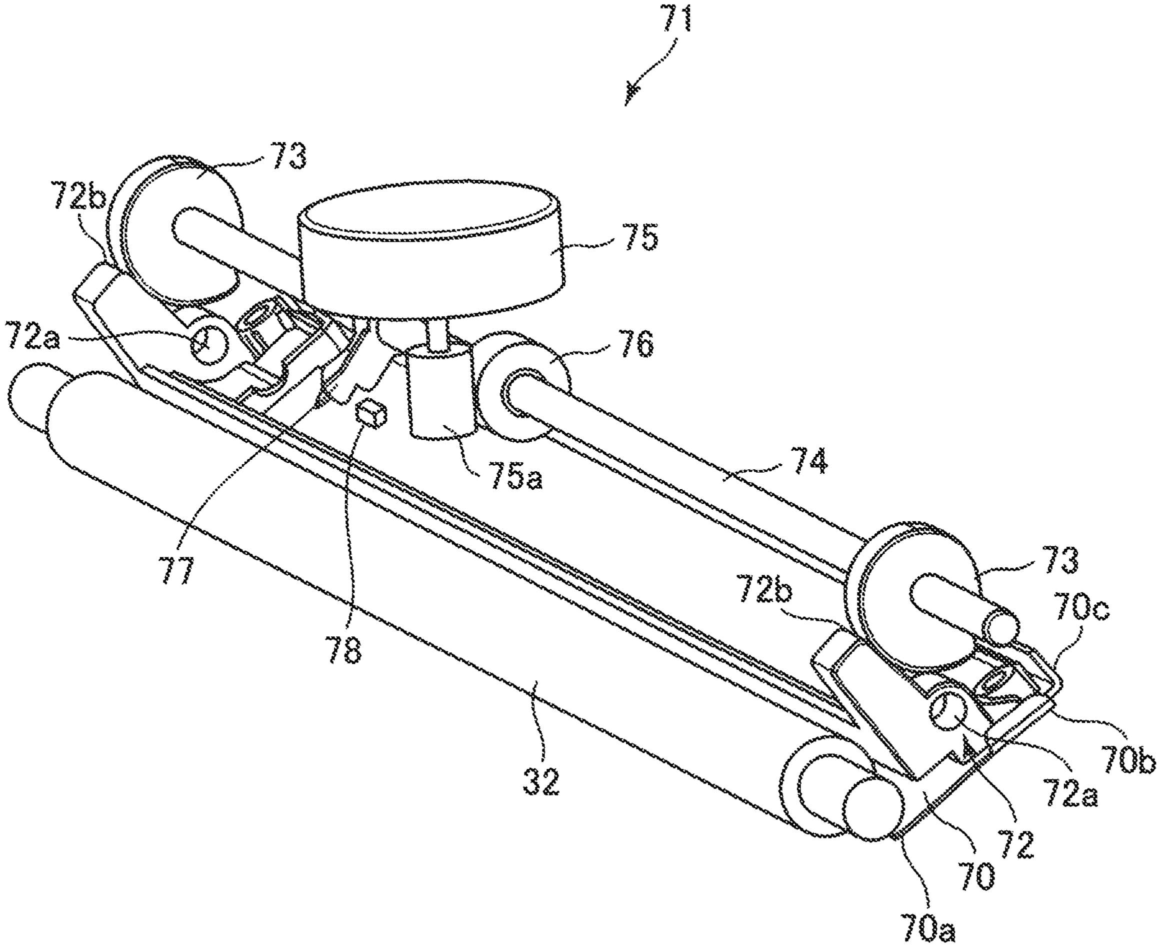
FIG. 3 is a schematic perspective view of a moving mechanism.

In addition, in the embodiment 1, the image forming apparatus 100 is configured to be able to change the position of the pressing member 70 by an action of the moving mechanism 71 (FIG. 3). As a result, in the embodiment 1, the image forming apparatus 100 is configured to be able to control the static shape (static position) of the pressing member 70, that is, the shape (posture) of the intermediary transfer belt 31 upstream of the secondary transfer portion N2.

In the embodiment 1, the bias (secondary transfer voltage) of the same polarity as the charging polarity of the toner constituting the toner image on the intermediary transfer belt 31 is applied to the secondary transfer inner roller 32, and the secondary transfer outer roller 41 is connected to ground. As a result, a transfer electric field is formed in the secondary transfer portion N2. In the secondary transfer portion N2 where the transfer electric field is formed, the recording material P is conveyed while being guided by the transfer guide 22 (FIG. 1). As shown in FIG. 2(*a*), the recording material P is conveyed toward the secondary transfer portion N2 with the tip of the recording material P in contact with the intermediary transfer belt 31 upstream of the secondary transfer portion N2 and also in contact with the toner image formed on the surface of the intermediary transfer belt 31. As shown in FIG. 2(*b*), when this recording material P is conveyed to the secondary transfer portion N2, the toner image is transferred from the intermediary transfer belt 31 to this recording material P by a pressurizing action between the secondary transfer inner roller 32 and the secondary transfer outer roller 41 and an electrical action of the transfer electric field.

Here, for highly accurate secondary transfer, a length of contact (here, also referred to as "contact length") between the intermediary transfer belt 31 and the recording material P with respect to the rotational direction of the intermediary transfer belt 31 upstream of the secondary transfer portion N2 when the recording material P is conveyed to the secondary transfer portion N2 is important.

If the contact length is long, image defects may occur due to sliding between the toner image formed on the surface of the intermediary transfer belt 31 and the recording material P. On the other hand, if the contact length is short, a gap (space) G (FIG. 2(*c*)) between the intermediary transfer belt 31 and the recording material P becomes large, and image defects may occur due to electrical discharge phenomena occurring in the gap G. Furthermore, when recording material P with high rigidity, such as thick paper or coated paper, is used, the intermediary transfer belt 31 is easily deformed when the recording material P enters the contact position of the tip of the recording material P with the intermediary transfer belt 31 upstream of the secondary transfer portion N2. As a result, the gap G described above is more likely to occur, and image defects due to the electrical discharge in the gap G may be more likely to occur.

By providing the pressing member 70 as in the embodiment 1, it becomes easier to set the appropriate contact length between the intermediary transfer belt 31 and the recording material P upstream of the secondary transfer portion N2. In particular, in the embodiment 1, the shape (posture) of the intermediary transfer belt 31 upstream of the secondary transfer portion N2 can be controlled by variable control of the position of the pressing member 70 with the moving mechanism 71. As a result, the toner image can be stably transferred onto the recording material P by optimizing the contact length between the intermediary transfer belt 31 and the recording material P upstream of the secondary transfer portion N2. Furthermore, even when recording material P with high rigidity, such as thick paper or coated paper, is used, the deformation of the intermediary transfer belt 31 when the intermediary transfer belt 31 and recording material P come into contact can be suppressed by the effect of the elastic urging of the pressing member 70. This can suppress the gap G between the intermediary transfer belt 31 and the recording material P from becoming larger. In addition, even when the same type of recording material P is used, for example, a user or other operator may adjust a high-voltage bias (secondary transfer voltage) by using an adjustment function provided in the image forming apparatus 100, depending on a type of image to be output or a desired quality of a product. In such cases, the position of the pressing member 70 can be arbitrarily changed by the moving mechanism 71, so that the position of the pressing member 70 can be adjusted in consideration of suppressing image defects caused by the discharge phenomenon mentioned above, etc., according to the adjustment of the high-voltage bias.

Incidentally, the image forming apparatus 100 in the embodiment 1 is a high-productivity device, and the intermediary transfer belt 31 is conveyed at a speed of 600 [mm/s]. In addition, in the image forming apparatus 100 of the embodiment 1, the toner is negatively polarized. Further, in the image forming apparatus 100 of the embodiment 1, the high voltage bias (secondary transfer voltage) of −10 [kV] is applied to the secondary transfer inner roller 32 to ensure appropriate transfer performance even at that conveying speed of the intermediary transfer belt 31. Provided, the conveying speed of the intermediary transfer belt 31, the polarity of toner, and the value of the secondary transfer voltage are not limited to these values.

In addition, in the embodiment 1, the secondary transfer outer roller 41 is elastically urged by the pressure spring 42, but the present invention is not limited to such a configuration. For example, the secondary transfer outer roller 41 may be positioned to interfere with the secondary transfer inner roller 32, and the pressure applied to the secondary transfer portion N2 may be secured by the hardness of the secondary transfer outer roller 41.

3. Pressing Member and Moving Mechanism

Figure 4:
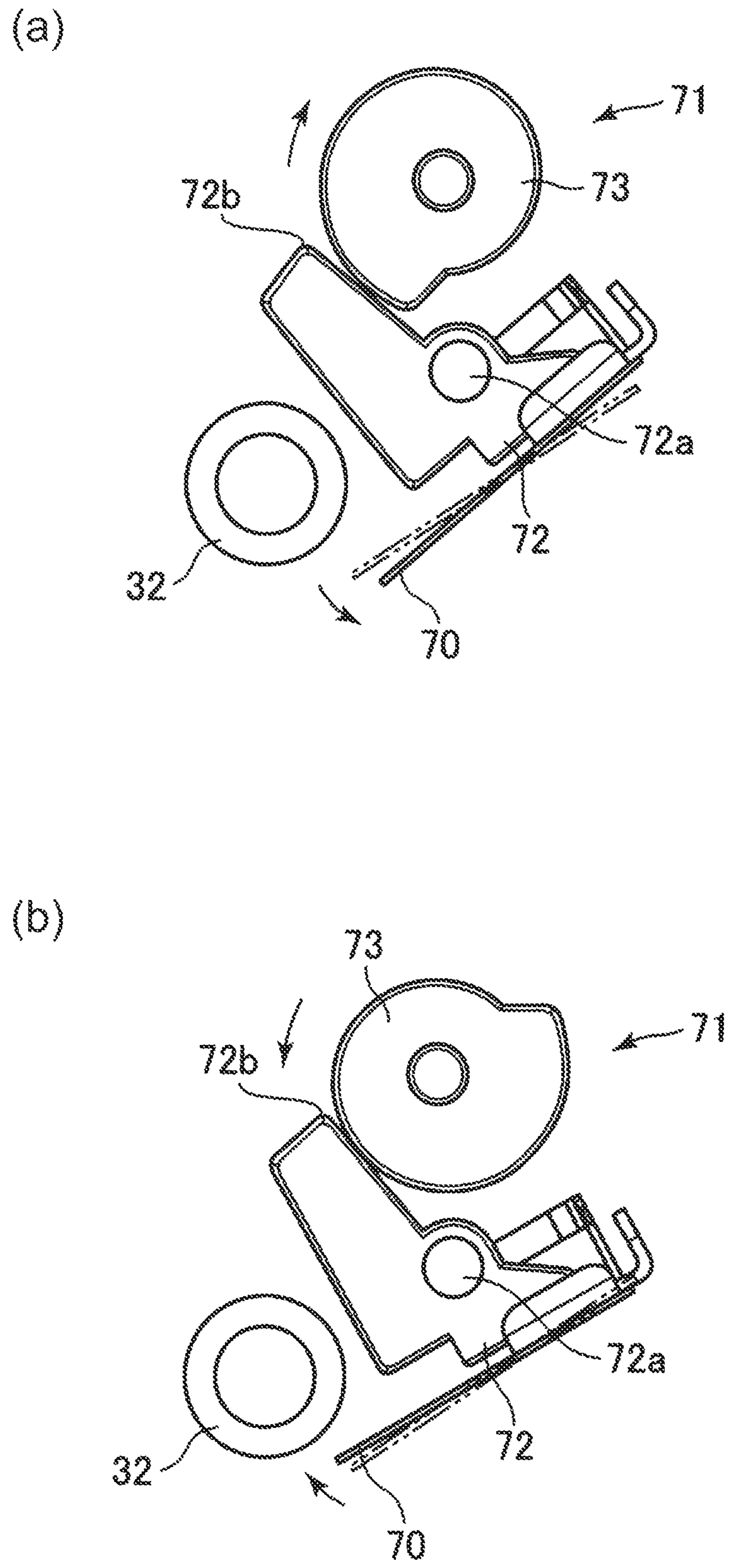
FIG. 4, part (a) and part (b), illustrates schematic side views of the moving mechanism.

Next, the pressing member 70 in the embodiment 1 and the moving mechanism 71 for changing the position of the pressing member 70 are described. FIG. 3 is a schematic perspective view of the pressing member 70 and the moving mechanism 71 in the embodiment 1. In addition, FIG. 4 is a schematic side view of the vicinity of the pressing member 70 viewed from one end of the rotation axis direction of the secondary transfer inner roller 32 (near side of the paper in FIG. 1), substantially parallel to the rotation axis direction, to explain the operation of the moving mechanism 71 in the embodiment 1. FIG. 4 illustrates a state in which the intermediary transfer belt 31 is not provided for illustration.

<Pressing Member>

In the embodiment 1, the image forming apparatus 100 has the pressing member (backup member) 70 on the inner circumference surface side of the intermediary transfer belt 31, near the upstream of the secondary transfer portion N2. The pressing member 70 can press the inner circumference surface of the intermediary transfer belt 31 in the vicinity of an entrance of the secondary transfer portion N2 to cause the intermediary transfer belt 31 to stretch out to the outer circumference side. The pressing member 70 is arranged so that it can contact the inner circumferential surface of the intermediary transfer belt 31 upstream of the secondary transfer inner roller 32 and downstream of the pre-secondary transfer roller 35 with respect to the rotational direction of the intermediary transfer belt 31.

In particular, in the embodiment 1, the pressing member 70 is positioned so that the pressing member 70 can contact the inner circumferential surface of the intermediary transfer belt 31 upstream of the secondary transfer inner roller 32 and downstream of the downstream tip of the transfer guide 22 (first guide member 22*a*), with respect to the conveyance direction of the recording material P.

In the embodiment 1, the pressing member 70 is constituted of a substantially rectangular plate-like (sheet-like) member in plain view, having a predetermined length in a longitudinal direction, which is arranged in parallel with a widthwise direction of the intermediary transfer belt 31, and in a widthwise direction, which is substantially perpendicular to the longitudinal direction, and a predetermined thickness. Incidentally, the widthwise direction of the intermediary transfer belt 31 is substantially perpendicular to the moving direction of the surface of the intermediary transfer belt 31 and is parallel to the rotation axis direction of the secondary transfer inner roller 32. The longitudinal direction of the pressing member 70 is equivalent to the widthwise direction of the intermediary transfer belt 31. A free end portion (tip portion) 70*a* of the pressing member 70, which is one end portion of the pressing member 70 in the widthwise direction (the end portion of the downstream side with respect to the rotational direction of the intermediary transfer belt 31), is capable of pressing the intermediary transfer belt 31 and of contacting the inner circumference surface of the intermediary transfer belt 31 over the substantially entire width of the intermediary transfer belt 31. In addition, in the embodiment 1, a fixed end portion (base portion) 70*b* of the pressing member 70, which is the other end portion of the pressing member 70 in the widthwise direction (an end portion of the upstream side with respect to the rotational direction of the intermediary transfer belt 31), is fixed to amounting portion 70*c* by adhesion, etc. In the embodiment 1, the mounting portion 70*c* is constituted of a sheet metal having a plate-like portion extending along the widthwise direction of the intermediary transfer belt 31 (longitudinal direction of the pressing member 70) and is used to attach the pressing member 70 to the moving mechanism 71 described below.

The pressing member 70 is, in the embodiment 1, formed of a resin material. In the embodiment 1, the pressing member 70 is formed of PPS (polyphenylene sulfide) with a thickness of 0.5 mm and elastically urges the intermediary transfer belt 31 by using flex elasticity of the pressing member 70. Incidentally, the pressing member 70 is not limited to the configuration of this embodiment 1, but any material can be used as long as the material can elastically urge the intermediary transfer belt 31. For example, the thickness of the pressing member 70 is not limited to 0.5 mm, but from 0.4 to 1.5 mm is suitable; for example, it may be 1.0 mm. In addition, the material of the pressing member 70 is not limited to PPS, but may be PEEK (polyetheretherketone), PET (polyethylene terephthalate), etc.

Here, it is preferable for the pressing member 70, more specifically the end portion of the free end portion (tip portion) 70*a* side of the pressing member 70 with respect to the widthwise direction (here also simply referred to as "tip"), to be arranged as close as possible to the secondary transfer inner roller 32. Provided, the pressing member 70 is arranged so as not to contact the secondary transfer inner roller 32. The pressing member 70 is, for example, arranged to contact the inner circumferential surface of the intermediary transfer belt 31 at a distance of, for example, about 2 mm or more, typically 10 mm or more, from the position where the secondary transfer inner roller 32 and the intermediary transfer belt 31 are in contact to an upstream position with respect to the rotational direction of the intermediary transfer belt 31. In addition, the pressing member 70 is, for example, arranged to contact the inner circumferential surface of the intermediary transfer belt 31 at a distance of about 40 mm or less, typically 25 mm or less, from the position where the secondary transfer inner roller 32 and the intermediary transfer belt 31 are in contact to the upstream position with respect to the rotational direction of the intermediary transfer belt 31.

<Moving Mechanism>

In the embodiment 1, the image forming apparatus 100 has a moving mechanism 71 for changing the position of the pressing member 70. By changing the position of the pressing member 70, the moving mechanism 71 can control the static shape (static position) of the pressing member 70, that is, the shape (posture) of the intermediary transfer belt 31 upstream of the secondary transfer portion N2. As a result, the moving mechanism 71 can optimize the contact length between the intermediary transfer belt 31 and the recording material P upstream of the secondary transfer portion N2. In other words, the moving mechanism 71 can control the pressing amount (the penetration amount described below) of the pressing member 70 toward the intermediary transfer belt 31 by changing the position of the pressing member 70. In addition, the moving mechanism 71 may be able to change a state of contact or separation of the pressing member 70 from the intermediary transfer belt 31 by changing the position of the pressing member 70.

The moving mechanism 71 has a supporting member 72 extending along the widthwise direction of the intermediary transfer belt 31.

The pressing member 70 is fixed to the supporting member 72. In the embodiment 1, the pressing member 70 has a portion of the fixed end portion 70*b* side with respect to the widthwise direction of the pressing member 70 fixed to the mounting portion 70*c* over substantially the entire width of the pressing member 70 in the longitudinal direction of the pressing member 70 by adhesion, etc., and the mounting portion 70*c* is fixed to the supporting member 72 by screws, etc. At both ends of the supporting member 72, with respect to a longitudinal direction of the supporting member 72, support holes 72*a* are provided, which holes are configured as cylindrical holes. The supporting member 72 is supported by a frame (not shown), etc., of the intermediary transfer belt unit so that the supporting member 72 can rotate around a rotation axis substantially parallel to the widthwise direction of the intermediary transfer belt 31 around the support holes 72*a*. Thus, by rotating the supporting member 72 around the rotation axis substantially parallel to the widthwise direction of the intermediary transfer belt 31, it is possible to make the pressing member 70 rotate around the rotation axis and to change the position of the pressing member 70.

In addition, the moving mechanism 71 has a cam shaft 74, which is constituted of a cylindrical member extending along the widthwise direction of the intermediary transfer belt 31. The cam shaft 74 is supported by the frame (not shown), etc. of the intermediary transfer belt unit 30 so that it can rotate around the rotation axis substantially parallel to the widthwise direction of the intermediary transfer belt 31. In addition, the moving mechanism 71 includes a cam 73, a transmission gear 76, and a detection flag (cam position flag) 77. Each of the cam 73, the transmission gear 76, and the detection flag 77 is each fixed to the cam shaft 74. The cams 73 are provided at both ends of the rotation axis direction of the cam shaft 74, respectively. In addition, the moving mechanism 71 includes a moving mechanism driving motor (cam driving motor) 75, which is constituted of a stepping motor as a driving source. The moving mechanism driving motor 75 is fixed to the frame of the intermediary transfer belt unit 30 (not shown), etc., so that the drive gear 75*a* fixed to an output shaft of the moving mechanism driving motor 75 can mesh with the transmission gear 76 fixed to the cam shaft 74. When the moving mechanism driving motor 75 rotates, drive is transmitted to the cam shaft 74 via the transmission gear 76, and the cam 73, the transmission gear 76, and the detection flag 77 rotate together with the cam shaft 74 around the rotation axis substantially parallel to the widthwise direction of the intermediary transfer belt 31.

The cam 73 as an actuating portion is in contact with a cam follower 72*b* on the supporting member 72 as a moving portion. The cam 73 forms a stepless surface whose radius from a center of rotation varies uniformly with a rotation angle. Therefore, when the cam 73 rotates due to the rotation of the moving mechanism driving motor 75, the supporting member 72 rotates about the support hole 72*a*. As a result, the moving mechanism 71 can move the pressing member 70 to change the position of the pressing member 70. Here, in the embodiment 1, changing the position of the pressing member 70 means, more specifically, changing a position of the tip of the pressing member 70 (hereinafter simply referred to as a "tip position") when the intermediary transfer belt 31 is assumed to be absent. Specifically, in the embodiment 1, changing the position of the pressing member 70 means changing the position of the supporting member 72 as a movable moving portion that the moving mechanism 71 includes.

In addition, the moving mechanism 71 includes a detection sensor (cam position sensor, cam HP sensor) 78 as a detection means (detection portion) to detect a position of the cam 73 in the rotational direction, in particular, a home position (HP) in the rotational direction in the embodiment 1. The detection sensor 78 and the detection flag 77 as an indicating means (indicating portion) fixed to the cam shaft 74 mentioned above constitute an optical position detecting mechanism. A posture of the moving mechanism 71 can be set to a preset neutral state by an action of the detection sensor 78 and the detection flag 77.

As shown in FIG. 4(*a*), when moving the pressing member 70 in a direction of pressing the intermediary transfer belt 31, the cam 73 is driven by the moving mechanism driving motor 75 and rotates clockwise. As a result, the supporting member 72 rotates counterclockwise around the support hole 72*a*, and the position of the pressing member 70 (more precisely, the tip position) moves toward the outer circumference surface side of the intermediary transfer belt 31. In addition, as shown in FIG. 4(*b*), when moving the pressing member 70 in the opposite direction of the above, i.e., away from the intermediary transfer belt 31, the cam 73 is driven by the moving mechanism driving motor 75 and rotates counterclockwise. As a result, the supporting member 72 rotates clockwise around the support hole 72*a*, and the position of the pressing member 70 (more precisely, the tip position) moves toward the inner circumference surface side of the intermediary transfer belt 31.

Incidentally, in the embodiment 1, the supporting member 72 is urged to rotate in a direction in which the cam follower 72*b* engages the cam 73. Other than the supporting member 72 being urged by the tension of the intermediary transfer belt 31 via the pressing member 70, a spring, etc., may be provided as an urging means to urge the supporting member 72. This allows the pressing member 70 to be separated from the intermediary transfer belt 31.

Thus, the moving mechanism 71 may be configured to change the position of the pressing member 70 to change at least one of the penetration amount (pressing amount) of the pressing member 70 to the intermediary transfer belt 31 and a state of contact or separation of the pressing member 70 from the intermediary transfer belt 31. In the embodiment 1, the moving mechanism 71 is configured to change both of the penetration amount (pressing amount) of the pressing member 70 to the intermediary transfer belt 31 and the state of contact or separation of the pressing member 70 from the intermediary transfer belt 31. Incidentally, for simplicity's sake, changing the penetration amount (pressing amount) of the pressing member 70 to the intermediary transfer belt 31 may be described as including changing the state of contact or separation of the pressing member 70 from the intermediary transfer belt 31.

Figure 5:
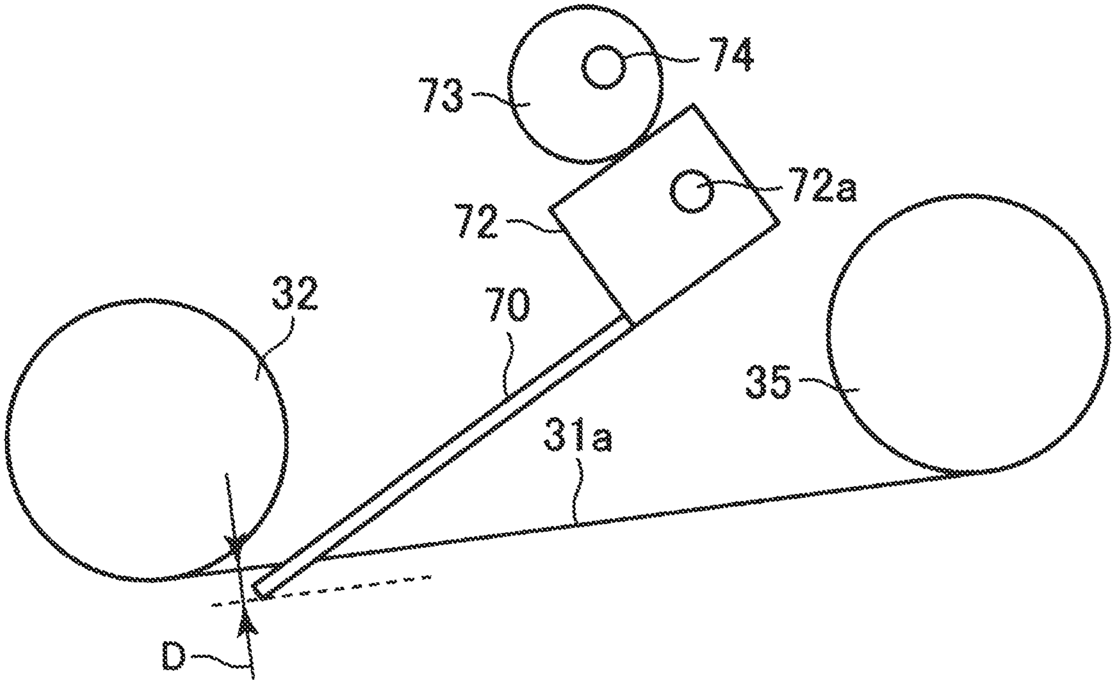
FIG. 5 is a schematic cross-sectional view to illustrate a penetration (entering) amount of a pressing member.

FIG. 5 is a schematic cross-sectional view (cross-section substantially perpendicular to the rotation axis direction of the secondary transfer inner roller 32) to illustrate the penetration amount of the pressing member 70 to the intermediary transfer belt 31. The pressing amount of the pressing member 70 against the intermediary transfer belt 31 can be expressed by the penetration amount of the pressing member 70 to the intermediary transfer belt 31. The penetration amount of the pressing member 70 is roughly the amount by which the pressing member 70 causes the intermediary transfer belt 31 to stretch outward against the tension surface of the intermediary transfer belt 31 formed by the tension between the secondary transfer inner roller 32 and the pre-secondary transfer roller 35. The pre-secondary transfer roller 35 is an example of an upstream roller positioned adjacent to the secondary transfer inner roller 32 and upstream, with respect to the rotational direction of the intermediary transfer belt 31, of the secondary transfer inner roller 32 among the plurality of stretching rollers. In other words, in the sectional view shown in FIG. 5, a common tangent line between the secondary transfer inner roller 32 and the pre-secondary transfer roller 35 on a side in contact with the intermediary transfer belt 31 is referred to as a common tangent line 31*a*. The penetration amount D of the pressing member 70 can be defined as a normal distance from the common tangent line 31*a* to the tip of the pressing member 70 (the distance between the common tangent line 31*a* and a line passing through the tip of the pressing member 70 and parallel to the common tangent line 31*a*). Incidentally, depending on relative positions of the secondary transfer inner roller 32 and the secondary transfer outer roller 41 with respect to the rotational direction of the intermediary transfer belt 31, a stretch surface of the intermediary transfer belt 31 upstream of the secondary transfer portion N2 may be formed by being stretched by the secondary transfer outer roller 41 and the pre-secondary transfer roller 35. In this case, the penetration amount can be defined in the same manner as mentioned above for a common tangent line between the secondary transfer outer roller 41 and the pre-secondary transfer roller 35 on a side in contact with the intermediary transfer belt 31.

Figure 6:
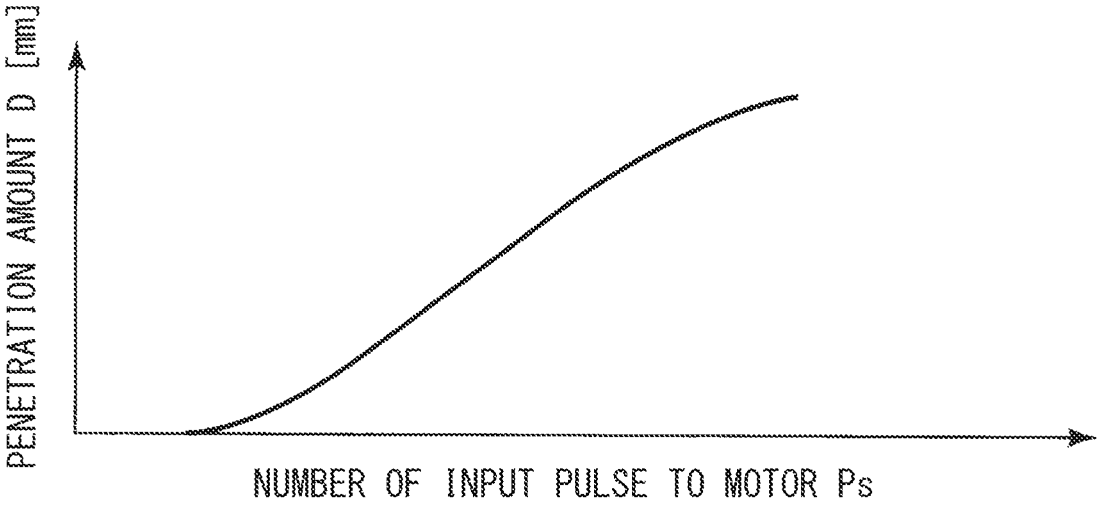
FIG. 6 is a chart illustrating an outline of a relationship between a penetration amount of the pressing member and a number of input pulses.
Figure 10:
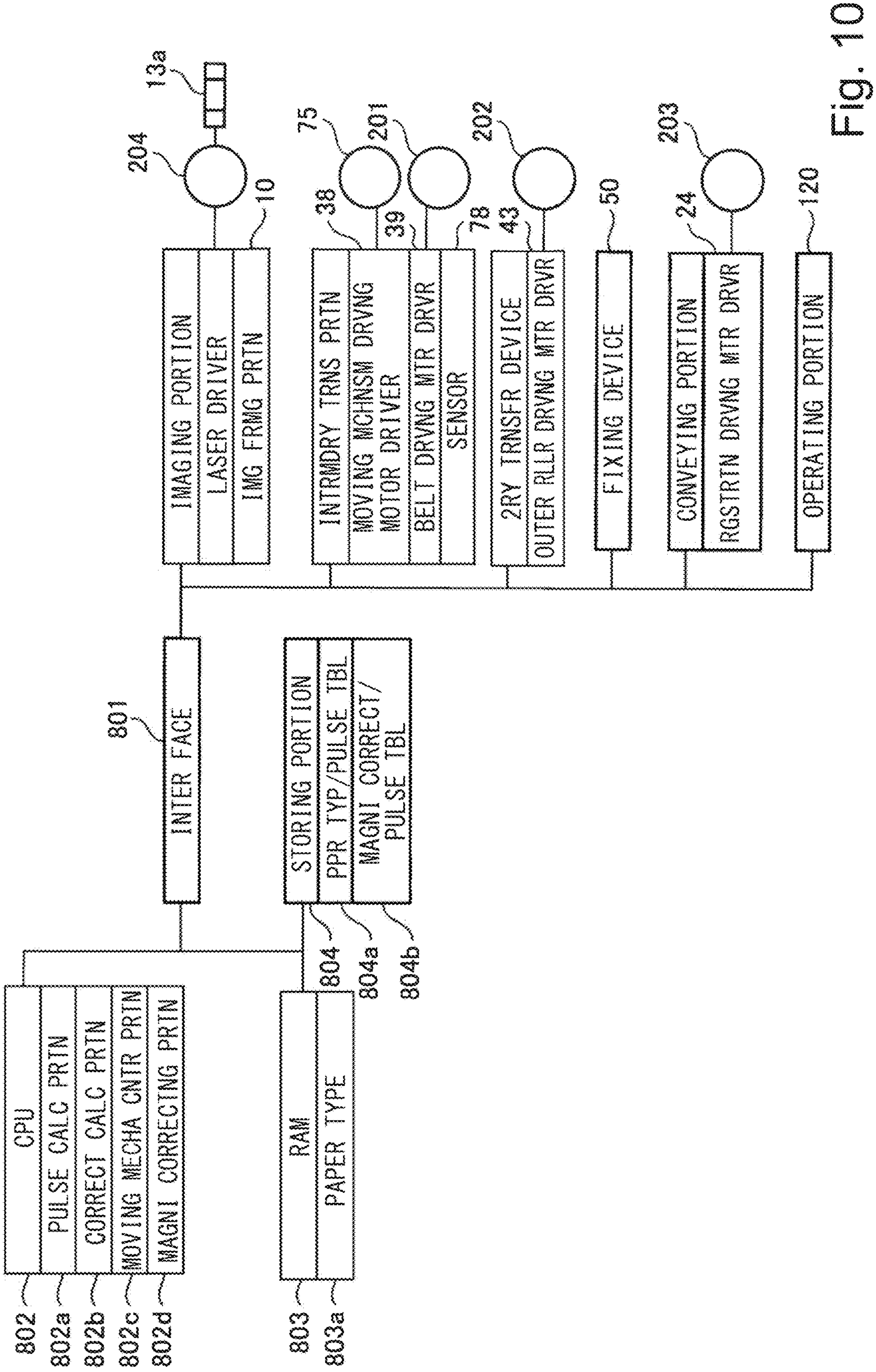
FIG. 10 is a control block diagram of the image forming apparatus.

FIG. 6 is a schematic chart illustrating a relationship between the penetration amount D of the pressing member 70 and a number of pulses (number of input pulses) Ps input to the moving mechanism driving motor 75. As described in detail below, in the embodiment 1, the image forming apparatus 100 has a CPU 802, and a moving mechanism control portion 802*c* is realized by the CPU 802 (FIG. 10). The moving mechanism control portion 802*c* can control the position of the supporting member 72 with respect to a moving direction of the supporting member 72 by controlling the rotation angle of the cam 73. Therefore, the moving mechanism control portion 802*c* can control the position (more precisely, the tip position) of the pressing member 70. In other words, the moving mechanism control portion 802*c* can detect the neutral state (home position of the cam 73) of the moving mechanism 71 based on a signal (information) from the detection sensor 78. In addition, the moving mechanism control portion 802*c* can control the moving mechanism driving motor 75 with pulse via a moving mechanism driving motor driver 38 (FIG. 10), which is described below. By inputting an arbitrary number of pulses Ps to the moving mechanism driving motor 75 via the moving mechanism driving motor driver 38, the moving mechanism control portion 802*c* can move the supporting member 72 from the neutral state mentioned above to any position to move the pressing member 70 to any position. As a result, the penetration amount D of the pressing member 70 to the intermediary transfer belt 31 can be changed as desired (FIG. 6).

Although it is not limited to this example, the penetration amount D of the pressing member 70 is preferable about from 1.0 mm to 3.5 mm. This can stabilize the shape of the intermediary transfer belt 31 upstream of the secondary transfer portion N2 and reduce the possibility that a smooth rotation of the intermediary transfer belt 31 is hindered by an excessively increased load on the contact surface between the pressing member 70 and the intermediary transfer belt 31. In addition, the penetration amount D of the pressing member 70 may be a desired value when the recording material P is in the vicinity of the entrance of the secondary transfer portion N2 and when the recording material P is passing through the secondary transfer portion N2. The vicinity of the entrance of the secondary transfer portion N2 is, more specifically, an area corresponding to an area of the intermediary transfer belt 31 between a position where the pressing member 70 contacts the intermediary transfer belt 31 and the secondary transfer portion N2, with respect to the conveyance direction of the recording material P. In addition, for example, in a standby state of the image forming apparatus 10, in a power OFF state or in a sleep state, the pressing member 70 can be positioned at a distance separate from (or simply at a position in contact with) the intermediary transfer belt 31. Incidentally, the standby state is a state in which the power is ON and waiting for job input, while the sleep state is a state in which the power is ON and waiting to return to the standby state, etc. with less power consumption than the standby state. This suppresses deformation, etc., of the pressing member 70 when the image forming apparatus 100 is left unattended. In the embodiment 1, the neutral state of the moving mechanism 71 is set to the state in which the pressing member 70 is separated from the intermediary transfer belt 31. In the embodiment 1, the moving mechanism 71 is set to the neutral state in the standby state, the power OFF state or the sleep state of the image forming apparatus 100.

4. Speeds of Intermediary Transfer Belt and Recording Material in the Secondary Transfer Portion Next, speeds of the intermediary transfer belt 31 and the recording material P in the secondary transfer portion N2 are described.

Figure 7:
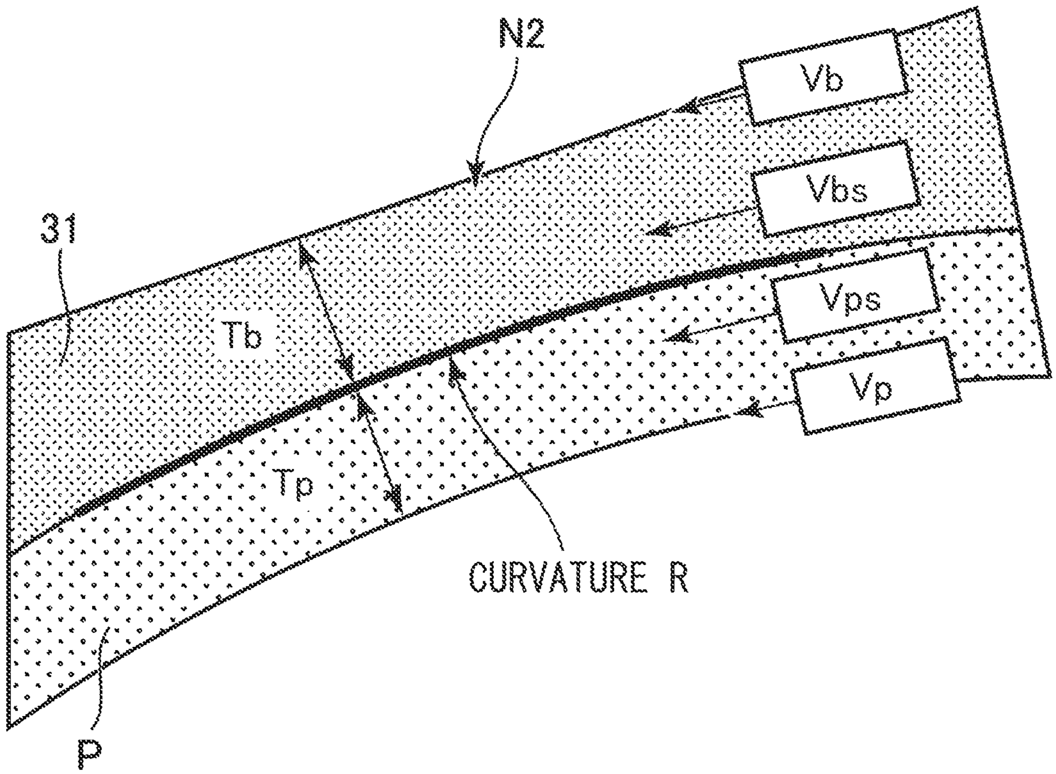
FIG. 7 is a schematic diagram illustrating speeds of an intermediary transfer belt and of a recording material in the secondary transfer portion.

FIG. 7 is a schematic view illustrating a schematic cross-sectional view of the intermediary transfer belt 31 and the recording material P in the secondary transfer portion N2 (a cross-sectional view substantially perpendicular to the rotation axis direction of the secondary transfer inner roller 32). FIG. 7 illustrates, for example, the intermediary transfer belt 31 curved along the outer circumference surface of the secondary transfer outer roller 41, as in a Region 2 described below.

A conveying speed of the intermediary transfer belt 31 is defined as Vb, a conveying speed of the recording material P is defined as Vp, a surface speed of the intermediary transfer belt 31 in the secondary transfer portion N2 is defined as Vbs, a surface speed of the recording material P in the secondary transfer portion N2 is defined as Vps, a thickness of the intermediary transfer belt 31 is defined as Tb and a thickness of the recording material P is defined as Tp. Here, the conveying speed of the intermediary transfer belt 31 Vb is a moving speed of the inner circumferential surface (back surface) of the intermediary transfer belt 31 (also referred to here as "back surface speed"). And the back surface speed of the intermediary transfer belt 31 Vb can be represented by, specifically, a driving speed of the intermediary transfer belt 31 by the belt driving motor 201, and more specifically, by a circumferential speed (rotational speed, number of rotations) of the driving roller 33. In addition, the conveying speed of the recording material P Vp is a moving speed of a surface of a side (back surface) of the recording material P that is in contact with the secondary transfer outer roller 41. And, in the embodiment 1, the conveying speed of the recording material P Vp can be represented by, specifically, a driving speed of the secondary transfer outer roller 41 by the outer roller driving motor 202, and more specifically, by a circumferential speed (rotational speed, number of rotations) of the secondary transfer outer roller 41. In addition, the surface speed of the intermediary transfer belt 31 Vbs in the secondary transfer portion N2 is a moving speed of an outer circumferential surface (front surface) of the intermediary transfer belt 31 in the secondary transfer portion N2. In addition, the surface speed of the recording material P Vps in the secondary transfer portion N2 is a moving speed of a surface of a side (front surface) of the recording material P that is in contact with the intermediary transfer belt 31 in the secondary transfer portion N2.

As mentioned above, the following describes a case in which the intermediary transfer belt 31 has a curved shape (bent shape) along the outer circumference surface of the secondary transfer outer roller 41 in the secondary transfer portion N2. A curvature due to this curve (bend) is defined as R. In this case, the surface speed of the intermediary transfer belt 31 Vbs in the secondary transfer portion N2 can be expressed by the following formula (1).

$$Vbs=\{1/(1+R\times Tb)\}\times Vb \quad (1)$$

From the formula (1) above, it can be seen that when the intermediary transfer belt 31 has a curved shape along the outer circumference surface of the secondary transfer outer roller 41 in the secondary transfer portion N2, a relationship between the front and back speed of the intermediary transfer belt 31 in the secondary transfer portion N2 is basically Vbs<Vb. In addition, from the formula (1) above, it can be seen that as the curvature R becomes smaller, the surface speed of the intermediary transfer belt 31 Vbs in the secondary transfer portion N2 increases and asymptotically approaches the back surface speed of the intermediary transfer belt 31 Vb. In addition, if a direction of curvature is reversed, the relationship between the back surface speed Vb and the surface speed of the intermediary transfer belt 31 Vbs is interchanged. Using this principle, a velocity change of the recording material P in the secondary transfer portion N2 is explained.

Figure 8:
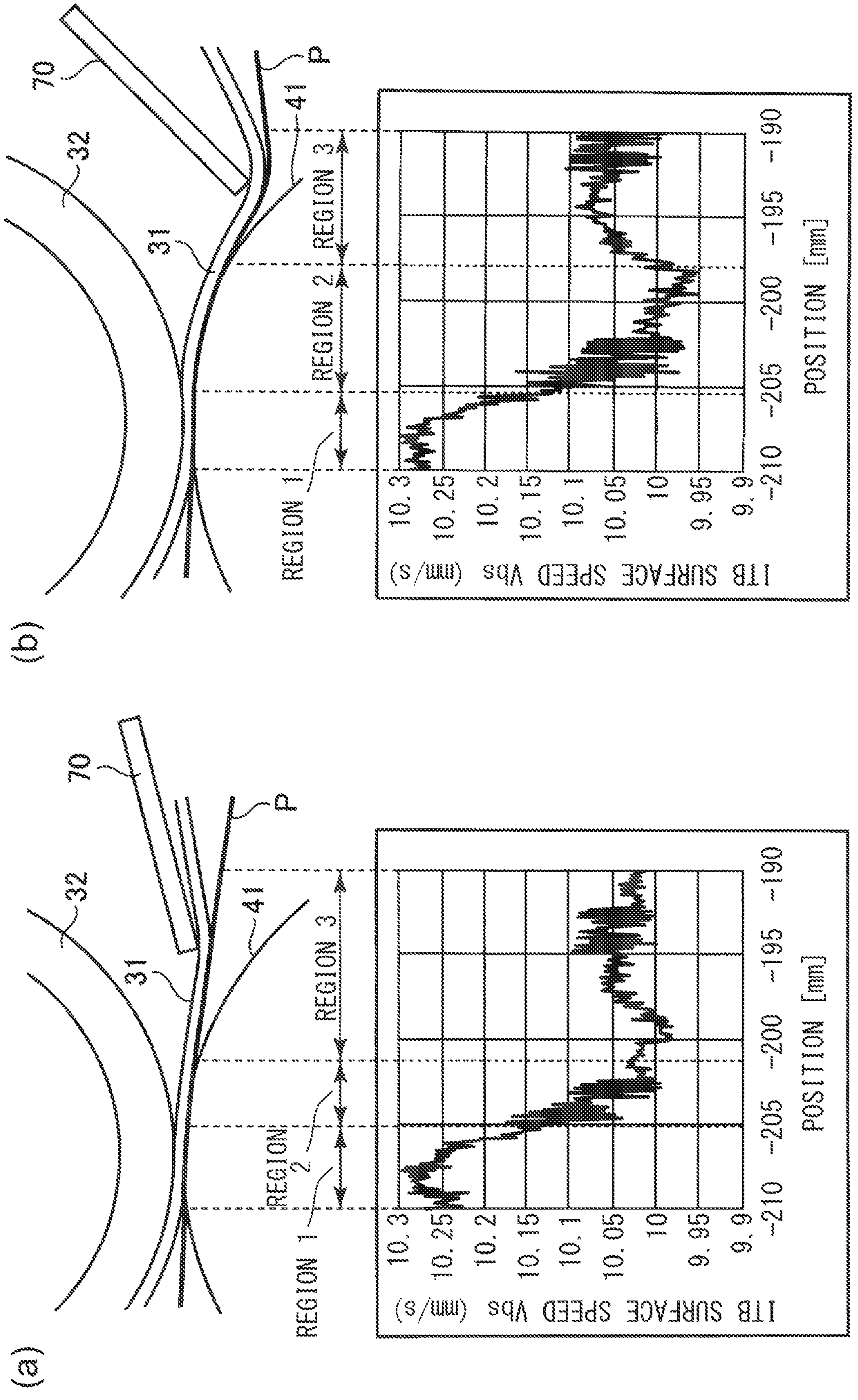
FIG. 8, part (a) and part (b), illustrates schematic diagrams and charts to explain a relationship between the penetration amount of the pressing member and a surface speed of the intermediary transfer belt.

FIG. 8 shows a schematic view (upper view) illustrating a schematic cross-sectional view of the secondary transfer portion N2 (a cross-sectional view substantially perpendicular to the rotation axis direction of the secondary transfer inner roller 32) and a chart (lower view) illustrating simulation results of the surface speed of the intermediary transfer belt 31 Vbs at each position with respect to the conveyance direction of the recording material P. Each of FIGS. 8(*a*) and 8(*b*) illustrates views mentioned above for cases in which the position of the pressing member 70 are different, and the penetration amount D of the pressing member 70 to the intermediary transfer belt 31 is set larger in FIG. 8(*b*) than in FIG. 8(*a*). In addition, in the lower views of FIGS. 8(*a*) and 8(*b*), the surface speed of the intermediary transfer belt 31 Vbs is expressed as a speed ratio when the intermediary transfer belt 31 is not curved (i.e., when Vbs is substantially equal to Vb) and where a reference speed is 10 mm/s. Here, a "Region 1" indicates an area (physical nip) where the secondary transfer inner roller 32 and the intermediary transfer belt 31 are in contact, the intermediary transfer belt 31 and the recording material P are in contact, and the recording material P and the secondary transfer outer roller 41 are in contact, with respect to the conveyance direction of the recording material P. In addition, a "Region 2" indicates an area (tension nip) where the intermediary transfer belt 31 and the recording material P are in contact and the recording material P and the secondary transfer outer roller 41 are in contact, but the secondary transfer inner roller 32 and the intermediary transfer belt 31 are not in contact, with respect to the conveyance direction of the recording material P. In addition, an area upstream from the Region 2 with respect to the conveyance direction of the recording material P (an area up to the vicinity of a position where the pressing member 70 is in contact with the intermediary transfer belt 31) is designated as a "Region 3". In the Region 3 (pre-nip), the intermediary transfer belt 31 and the recording material P are in contact at least in some areas adjacent to the Region 2, but the secondary transfer inner roller 32 and the intermediary transfer belt 31 are not in contact, and the recording material P and the secondary transfer outer roller 41 are not in contact.

In the embodiment 1, the hardness of the secondary transfer inner roller 32 is higher than that of the secondary transfer outer roller 41. In this case, the curve of the surface (outer circumference surface) of the intermediary transfer belt 31 in the Region 1 is formed according to the curvature of the secondary transfer inner roller 32, so that the surface speed of the intermediary transfer belt 31 Vbs in the Region 1 becomes faster, based on the principle of curvature described above. In contrast, in the Region 2, the curve of the surface (outer circumference surface) of the intermediary transfer belt 31 is formed according to the curvature of the secondary transfer outer roller 41, so that the surface speed of the intermediary transfer belt 31 Vbs decreases. In addition, when it comes to the vicinity of the contact point of the pressing member 70 with the intermediary transfer belt 31 in the Region 3, the surface of the intermediary transfer belt 31 (outer circumferential surface) has a curvature in the opposite direction to that of the Region 2, so that the surface speed of the intermediary transfer belt 31 Vbs increases. The surface speed of the recording material P Vps depends on the surface speed of the intermediary transfer belt 31 Vbs in the Region 1 and the Region 2. Comparing FIGS. 8(*a*) and 8(*b*), the Region 2, where the surface speed of the intermediary transfer belt 31 Vbs is relatively slower, is wider in FIG. 8(*b*) than in FIG. 8(*a*). Therefore, because this area acts as a brake, the surface speed of the recording material P Vps in the secondary transfer portion N2 is generally slower in the case of FIG. 8(*b*) (when the penetration amount D of the pressing member 70 is relatively large) than in the case of FIG. 8(*a*) (when the penetration amount D of the pressing member 70 is relatively small).

To explain further, the secondary transfer of the toner image from the intermediary transfer belt 31 to the recording material P is mainly performed in the Region 1 where the surface speed of the intermediary transfer belt 31 Vbs becomes faster as described above. In contrast, the surface speed of the recording material P Vps in the secondary transfer portion N2 is determined by the surface speed of the intermediary transfer belt 31 Vbs and the conveying speed of the recording material P Vp (the driving speed of the secondary transfer outer roller 41 in the embodiment 1) and depends on the surface speed of the intermediary transfer belt 31 Vbs in the Region 1 and the Region 2 as described above. When the Region 2 is relatively wide, as described above, this region acts as a brake against the surface speed of the recording material P Vps, and the surface speed of the recording material P Vps in the Region 1 tends to be relatively slow compared to the surface speed of the intermediary transfer belt 31 Vbs in the Region 1.

Thus, depending on the position of the pressing member 70, the relationship (speed difference) between the surface speed of the intermediary transfer belt 31 Vbs and the surface speed of the recording material P Vps in the Region 1 of the secondary transfer portion N2 where the secondary transfer is mainly performed may change. As a result, the elongation of the image (overall magnification) with respect to the conveyance direction of the recording material P may change. This discrepancy (offset) in the image elongation (overall magnification) in the conveyance direction of the recording material P becomes apparent, for example, as front-to-back registration misalignment (misalignment of printing positions of the front and back sides of the recording material) in a double-side printing, which leads to a deterioration in image quality. In double-side printing, the leading end and the trailing end of the recording material P of the conveyance direction are reversed during the secondary transfer of the toner image between the first side printing and the second side printing, so that if the printing position of the image of the trailing edge on the first side is deviated, the deviation between that position and the printing position of the image of the leading edge on the second side may be noticeable. However, even in a single-side printing, the misalignment of image elongation (overall magnification) with respect to the conveyance direction of the recording material P can lead to the deterioration in image quality.

Figure 9:
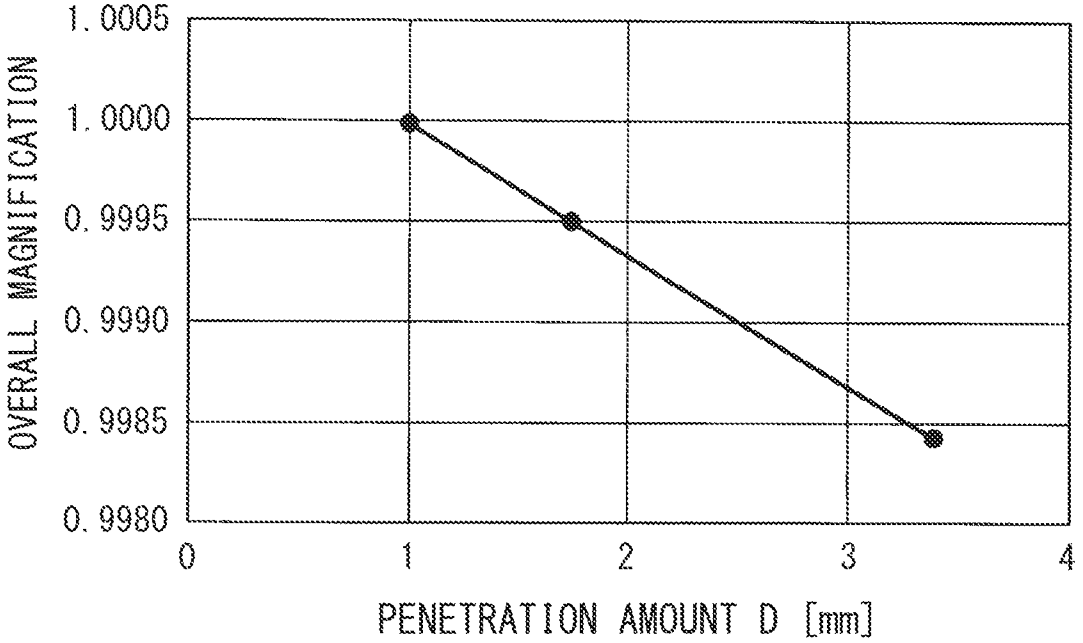
FIG. 9 is a chart illustrating a relationship between the penetration amount of the pressing member and an overall magnification of an image.

FIG. 9 is a chart showing measurement results of image elongation (overall magnification) with respect to the conveyance direction of the recording material P when the position of the pressing member 70 is moved in a system where the hardness of the secondary transfer inner roller 32 is actually higher than that of the secondary transfer outer roller 41. Here, the horizontal axis shows the penetration amount D of the pressing member 70 to the intermediary transfer belt 31, and the vertical axis shows the elongation (overall magnification) of the image based on an image width of a given test image with respect to the conveyance direction of the recording material P when the penetration amount D is 1 mm. From FIG. 9, it can be seen that as the penetration amount D of the pressing member 70 increases, the image elongation (overall magnification) with respect to the conveyance direction of the recording material P becomes smaller. This is synonymous with the fact that as the penetration amount D of the pressing member 70 increases, the surface speed of the recording material P Vps becomes slower in relation to the surface speed of the intermediary transfer belt 31 Vbs, which is also consistent with the simulation results described above.

Therefore, in the embodiment 1, the image forming apparatus 100 is configured to perform a process to correct the elongation of the image (overall magnification) with respect to the conveyance direction of the recording material P based on the setting of the position of the pressing member 70. In particular, in the embodiment 1, the image forming apparatus 100 is configured to execute a variable control of the setting of the position of the pressing member 70 based on information about the recording material P. and to execute the process to correct the elongation (overall magnification) of the image with respect to the conveyance direction of the recording material P based on the setting of the position of the pressing member 70.

As a result, according to the embodiment 1, it is possible to suppress changes in the elongation (overall magnification) of the image with respect to the conveyance direction of the recording material P by changing the position of the pressing member 70, while making it possible to obtain appropriate transferability according to the recording material P. Thus, for example, it is possible to suppress occurrences of image defect caused by micro-discharge in the air gap between the intermediary transfer belt 31 and the recording material P, while also suppressing occurrences of front-to-back registration misalignment caused by changes in the elongation (overall magnification) of the image with respect to the conveyance direction of the recording material P.

Incidentally, as in the embodiment 1, in a configuration where the hardness of the secondary transfer inner roller 32 is higher than that of the secondary transfer outer roller 41 and where the surface speed of the intermediary transfer belt 31 gets faster in the Region 1, the change in the overall magnification of the image according to the position of the pressing member 70 is more pronounced. On the other hand, contrary to the embodiment 1, in a configuration where the hardness of the secondary transfer inner roller 32 is lower than that of the secondary transfer outer roller 41, the following occurs. Thus, in this case, since the curve of the surface (outer circumference surface) of the intermediary transfer belt 31 in the Region 1 is formed according to the curvature of the secondary transfer outer roller 41, the surface speed of the intermediary transfer belt 31 Vbs in the Region 1 decreases based on the principle of curvature described above. Therefore, the relationship between the surface speed of the intermediary transfer belt 31 Vbs and the surface speed of the recording material P Vps in the Region 1 is unlikely to change even if the braking action by the surface speed of the intermediary transfer belt 31 Vbs in the Region 2 changes due to the position of the pressing member 70. Therefore, in the configuration where the hardness of the secondary transfer inner roller 32 is lower than that of the secondary transfer outer roller 41, the effect of the change in the overall magnification of the image due to the position of the pressing member 70 described above tends to be smaller than in the configuration where the former is higher than the latter as in the embodiment 1.

5. Control Configuration

FIG. 10 is a control block diagram of the image forming apparatus 100 in the embodiment 1. The image forming apparatus 100 includes the CPU 802 as a processing means, and a RAM 803 as a storage means, a storage portion 804 as the storage means, and an interface (input/output portion) 801 as an input/output means are connected to the CPU 802. The interface 801 sends control signals from the CPU 802 to various portions of the image forming apparatus 100 (various drivers, etc., as described below), and also sends detection signals from various sensors of the image forming apparatus 100 to the CPU 802. The CPU 802 reads the computer program stored in the storage portion 804 and executes the computer program using the RAM 803 as a work area, thereby controlling an overall operation of the image forming apparatus 100. The storage portion 804 is constituted of a nonvolatile memory, etc., and stores programs and parameters to be executed by the CPU 802.

In the embodiment 1, an imaging section (the laser driver 131 as a driving circuit for the exposure device 13, each portion of the image forming portions 10, etc.) is connected to the CPU 802 via the interface 801. In addition, the intermediary transfer portion (the belt driving motor driver 39 as a drive circuit for the belt driving motor 201, the moving mechanism driving motor driver 38 as a drive circuit for the moving mechanism driving motor 75, the detection sensor 78, etc.) is connected to the CPU 802 via the interface 801. In addition, a secondary transfer device (outer roller driving motor driver 43 as a drive circuit for outer roller driving motor 202, etc.) is connected to the CPU 802 via the interface 801. In addition, the fixing device 50 is connected to the CPU 802 via the interface 801. In addition, a conveyance portion (a resist driving motor driver 24, etc., as a drive circuit for the resist driving motor 203), an operating portion (an operating panel, a user interface) 120, etc., are connected to the CPU 802 via the interface 801. The operating portion 120 includes a display portion (display means) that displays information controlled by the CPU 802 and an input portion (input means) that inputs information to the CPU 802 by an operator such as a user and a service representative. The operating portion 120 may be configured to include a touch panel that has a function as a display means and as an input means. In addition, an external device such as a personal computer, an image reading device, etc., may be connected to the image forming apparatus 100.

The CPU 802 controls each portion of the image forming apparatus 100 to execute image forming operations based on job information input from the external device or the operating portion 120. The job information includes a start instruction (start signal), information about image forming conditions such as information about the recording material P (command signal), image information (image signal), etc. Incidentally, the information about the recording material P encompasses any information that can distinguish the recording material P such as attributes based on general characteristics such as plain paper, fine paper, glossy paper, gloss paper, coated paper, embossed paper, thick paper, thin paper, and paper quality (so-called paper type category), numerical values and numerical ranges such as basis weight, thickness, rigidity of the recording material, brand (including manufacturer, trade name, product number, etc.) and so forth. Each recording material P distinguished by the information about the recording material P can be considered to constitute a type of recording material P. In addition, the information about the recording material P may be included in print mode information that specifies operating settings of the image forming apparatus 100, such as "plain paper mode" and "thick paper mode," or may be substituted for the print mode information.

Here, the image forming apparatus 100 executes the job (print job), which is a series of operations to form and output images on a single or multiple recording materials P, initiated by a single start instruction. The job generally includes an image forming process (image forming operation), a pre-rotation process, a sheet interval process when images are formed on multiple recording materials P, and a post-rotation process. The image forming process includes periods in which formation of an electrostatic image of the image to be actually formed and output on the recording material P, formation of the toner image, and the primary and secondary transfers of the toner image are performed, and during image formation (image forming period) refers to this period. More specifically, the timings of the periods during the image formation differ at a position where each process of the formation of the electrostatic image, the formation of the toner image, the primary transfer of toner image, and the secondary transfer of the toner image is performed. The pre-rotation process is a period during which preparatory operations prior to the image forming operation are performed from a time when the start instruction is input to a time when the actual image forming process begins. The sheet interval process is a period corresponding to a time between one recording material P and the next recording material P in a continuous image forming process for multiple recording materials P (continuous image forming). The post-rotation process is a period during which organizing operations (preparatory operations) are performed after the image forming operation. A non-image formation time (non-image formation period) is a period other than the image formation time and includes the following periods. That is, the non-image formation time includes the power-off state, the sleep state, the standby state, the pre-rotation process, the sheet interval process, and the post-rotation process. Furthermore, the non-image formation time includes a pre-multi-rotation process, which is a preparatory operation performed when the image forming apparatus 100 is turned on or returns from the sleep state, and a period from the standby state to when the pre-rotation process or the pre-multi-rotation process begins. In the embodiment 1, as described below, the image forming apparatus 100 can execute an operation of setting (changing) the position of the pressing member 70 during the non-image formation time.

In the embodiment 1, in the RAM 803, a paper type storing area 803*a* is reserved to temporarily store information about the type of recording material P indicating the paper type category as information about the recording material P used in the job (also referred to here as "paper type information"). In addition, in the embodiment 1, in the storage portion 804, a number of pulses table storing area 804*a* is reserved to store information (paper type/number of pulses table) concerning combinations of the paper type information and the number of input pulses Ps to the moving mechanism driving motor 75 (that is, the position of the pressing member 70). In addition, in the embodiment 1, in the storage portion 804, a magnification correction amount table storing area 804*b* is reserved to store information (magnification correction amount/number of pulses table) concerning combinations of the number of input pulses Ps (i.e., the position of the pressing member 70) and a correction amount of the overall magnification of the image. Here, the information about the combination of the paper type information and the number of input pulses Ps stored in the number of pulses table storing area 804*a* may be preset for typical paper type information. Further, in addition to or instead of this, the information on the combinations of the paper type information and the number of input pulses Ps may be set by an operator such as a user from the operating portion 120 or the external device according to the image to be output or a desired quality of a product.

The CPU 802 executes the program stored in the storage portion 804 to realize a number of pulses calculating portion 802*a*, an overall magnification correction amount calculating portion 802*b*, the moving mechanism control portion 802*c*, and an overall magnification correcting portion 802*d* as functional blocks. By executing processes in these functional blocks, the CPU 802 can execute correction of the overall magnification of the image (correcting process).

In other words, the number of pulses calculating portion 802*a* calculates the number of input pulses Ps to the moving mechanism driving motor 75 according to the paper type information of the job stored in the paper type storing area 803*a* and the paper type/number of pulses table stored in the storage portion 804.

In addition, the moving mechanism control portion 802*c* moves the moving mechanism driving motor 75 through the moving mechanism driving motor driver 38 by an amount of the number of input pulses Ps calculated by the number of pulses calculating portion 802*a*.

In addition, the overall magnification correction amount calculating portion 802*b* calculates the amount of correction for the overall magnification of the image according to the number of input pulses Ps, based on the number of input pulses Ps calculated by the number of pulses calculating portion 802*a* and the magnification correction amount/number of pulses table stored in the storage portion 804.

In addition, the overall magnification correcting portion 802*d* executes correction of the overall magnification of the image by the amount of correction calculated by the overall magnification correction amount calculating portion 802*b*. In the embodiment 1, the overall magnification correcting portion 802*d* executes digital magnification, which corrects the overall magnification of the image by stretching and shrinking the image data itself, as an example of a means of executing the correction of the overall magnification of the image. In other words, in the embodiment 1, the overall magnification correcting portion 802*d* executes correction so that fluctuations in the overall magnification of the image are suppressed by modifying information about the magnification of the image with respect to the conveyance direction in digital image information (image data) acquired from the external device, etc. Any appropriate methods from the public domain can be used as a specific method itself for the digital magnification of the image. As mentioned above, when the penetration amount D of the pressing member 70 to the intermediary transfer belt 31 is increased, the overall magnification of the image is reduced. Therefore, in this case, the image data is changed so that the magnification of the toner image formed on the intermediary transfer belt 31 in advance with respect to the conveyance direction of the intermediary transfer belt 31 is enlarged. Conversely, when the penetration amount D of the pressing member 70 to the intermediary transfer belt 31 is reduced, a degree to which the overall magnification of the image is reduced becomes smaller or the overall magnification of the image is not reduced. Therefore, in this case, the image data should be changed so that the degree of magnification of the toner image formed on the intermediary transfer belt 31 with respect to the conveyance direction of the intermediary transfer belt 31 is reduced or a changing of the image data should not be executed. In this case, there could be a configuration in which the image data is changed in advance so that the magnification of the toner image formed on the intermediary transfer belt 31 with respect to the conveyance direction of the intermediary transfer belt 31 is reduced.

For example, when the recording material P used in the job is plain paper or thin paper, the penetration amount D of the pressing member 70 to the intermediary transfer belt 31 is set to 1 mm (or the penetration amount D is set to 0 mm or separated). And, in this case, the magnification of the image data in the sub-scan direction is set to one time (no digital magnification of the image). In addition, for example, when the recording material P used in the job is thick paper or coated paper with a larger basis weight (higher rigidity) than the plain paper or the thin paper mentioned above, the penetration amount D of the pressing member 70 to the intermediary transfer belt 31 is set to 3 mm. Then, in this case, the magnification of the image data in the sub-scan direction is set to larger than onetime (e.g., 1.0015 times).

6. Control Steps

Figure 11:
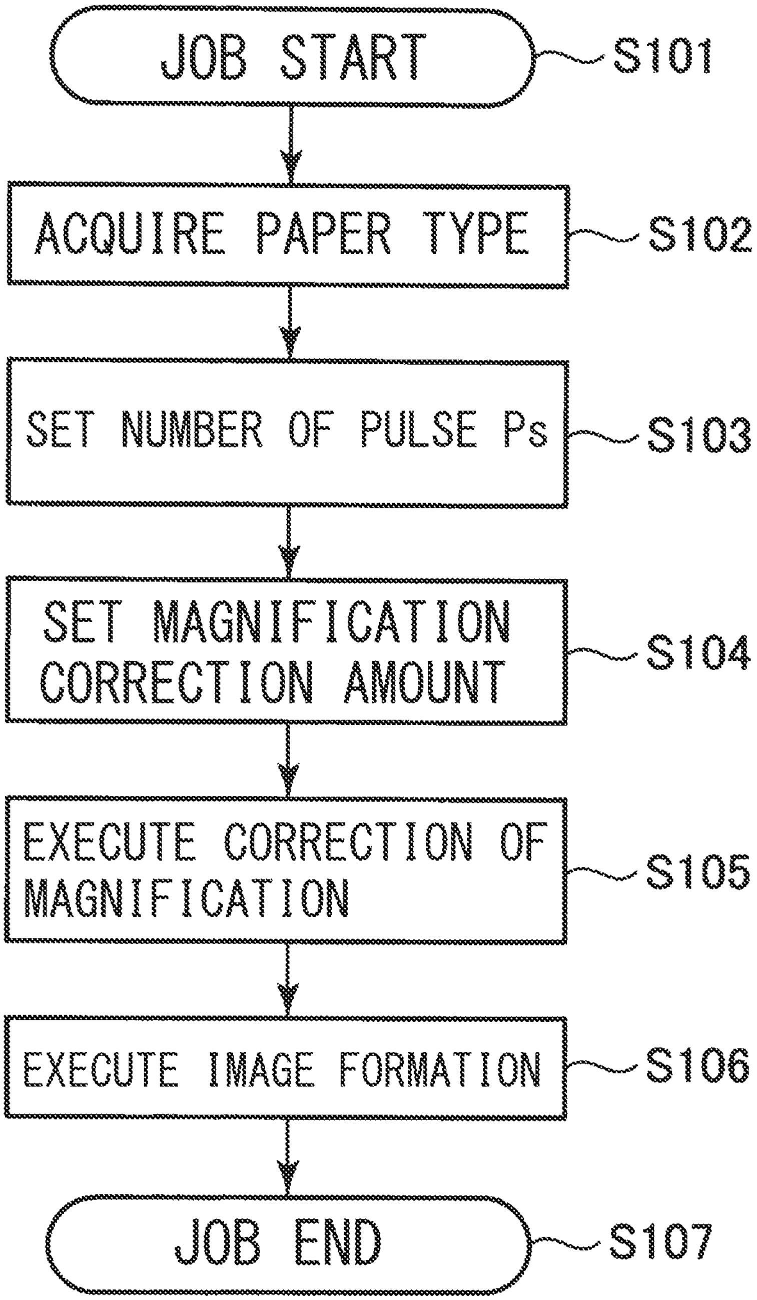
FIG. 11 is a flowchart illustrating an outline of steps of an operation of a job.

FIG. 11 is a flowchart illustrating an outline of an operation of a job including the correction of the overall magnification of the image in the embodiment 1. FIG. 11 is used to describe steps of the operation of the job in the embodiment 1.

When job information is input from an external device such as a personal computer, for example (S101), the CPU 802 acquires the paper type information for the job (S102). Then, in the number of pulses calculating portion 802*a*, the CPU 802 sets the number of pulses (number of input pulses) Ps to be input to the moving mechanism driving motor 75 according to the paper type information of the job based on the paper type/number of pulses table (S103). In addition, in the moving mechanism control portion 802*c*, the CPU 802 makes the pressing member 70 move to have the corresponding penetration amount D by inputting the number of input pulses Ps set above to the moving mechanism driving motor 75 (S103). In addition, in the overall magnification correction amount calculating portion 802*b*, the CPU 802 calculates the correction amount for the overall magnification of the image according to the number of input pulses Ps set above based on the magnification correction amount/number of pulses table (S104). Then, in the overall magnification correcting portion (image digital magnification execution portion) 802*d*, CPU 802 performs correction of the overall magnification of the image (digital magnification of the image) using the correction amount calculated above (S105). Since a preparation for the image formation is completed, then the CPU 802 executes the image formation (S106), and terminates the job when a predetermined number of images are formed (S107).

7. Modifications

In the embodiment 1, the correction of the overall magnification of the image was executed by digital magnification of the image but means for performing the correction of the overall magnification of the image is not limited to this. For example, a rotational speed of the polygon mirror 13*a* can be changed by changing a rotational speed of the polygon motor 204 through the laser driver 131 based on the amount of correction of the overall magnification of the image. As mentioned above, when the penetration amount D of the pressing member 70 to the intermediary transfer belt 31 is increased, the overall magnification of the image is reduced. Therefore, in this case, the rotational speed of the polygon mirror 13*a* is slowed down so that the magnification of the toner image formed on the intermediary transfer belt 31 with respect to the conveyance direction of the intermediary transfer belt 31 is enlarged. Conversely, when the penetration amount D of the press member 70 to the intermediary transfer belt 31 is reduced, a degree to which the overall magnification of the image is reduced becomes smaller or the overall magnification of the image is not reduced. Therefore, in this case, a degree to which the rotational speed of the polygon mirror 13*a* is slowed down should be reduced or the rotational speed of the polygon mirror 13*a* should not be changed. In this case, there could be a configuration in which the rotational speed of the polygon mirror 13*a* is increased to reduce the magnification of the toner image formed on the intermediary transfer belt 31 with respect to the conveyance direction of the intermediary transfer belt 31. This change in the magnification of the toner image formed on the intermediary transfer belt 31 by changing the rotational speed of the polygon mirror 13*a* may be done in combination with the digital magnification of the image in the embodiment 1, or it may be done alone. By executing in combination with these, it is possible to correct the magnification of the image sufficiently while suppressing an occurrence of downtime (a period during which images cannot be formed) associated with the change in the rotational speed of the polygon mirror.

In addition, a driving speed of the intermediary transfer belt 31 can be changed by changing a speed of the belt driving motor 201 through the belt driving motor driver 39 based on the correction amount of the overall magnification of the image. As mentioned above, when the penetration amount D of the pressing member 70 to the intermediary transfer belt 31 is increased, the surface speed of the intermediary transfer belt 31 Vbs becomes relatively faster than the surface speed of the recording material P Vps in the secondary transfer portion N2, and the overall magnification of the image is reduced. Therefore, in this case, the driving speed of the intermediary transfer belt 31 is slowed down to suppress a reduction of the overall magnification of the image. Conversely, when the penetration amount D of the pressing member 70 to the intermediary transfer belt 31 is reduced, a degree to which the overall magnification of the image is reduced becomes smaller or the overall magnification of the image is not reduced.

Therefore, in this case, a degree to which the driving speed of the intermediary transfer belt 31 is slowed down should be reduced or the driving speed of the intermediary transfer belt 31 should not be changed. In this case, there could be a configuration in which the driving speed of the intermediary transfer belt 31 is increased.

In addition, in the system that drives the secondary transfer outer roller 41, a rotational speed of the outer roller driving motor 202 can be changed through the outer roller driving motor driver 43 to change the driving speed of the secondary transfer outer roller 41 based on the correction amount of the overall image magnification. As mentioned above, when the penetration amount D of the pressing member 70 to the intermediary transfer belt 31 is increased, the surface speed of the recording material P Vps becomes slower relative to the surface speed of the intermediary transfer belt 31 Vbs in the secondary transfer portion N2, and the overall magnification of the image is reduced. Therefore, in this case, the driving speed of the secondary transfer outer roller 41 is increased to increase the surface speed of the recording material P Vps in the secondary transfer portion N2 to suppress the reduction in the overall magnification of the image. Conversely, when the penetration amount D of the pressing member 70 to the intermediary transfer belt 31 is reduced, a degree to which the overall magnification of the image is reduced becomes smaller or the overall magnification of the image is not reduced. Therefore, in this case, a degree to which the driving speed of the secondary transfer outer roller 41 is increased should be reduced or the driving speed of the secondary transfer outer roller 41 should not be changed. In this case, there could also be a configuration in which the driving speed of the secondary transfer outer roller 41 is slowed down.

The change of the driving speed of the intermediary transfer belt 31 and the driving speed of the secondary transfer outer roller 41 described above may be done individually or in combination. In other words, by changing a ratio Vo/Vb between the driving speed of the intermediary transfer belt 31 Vb and the driving speed of the secondary transfer outer roller 41 Vo, the change in the overall magnification of the image can be suppressed. When the penetration amount D of the pressing member 70 to the intermediary transfer belt 31 is increased, the ratio Vo/Vb mentioned above should be increased. Conversely, when the penetration amount D of the pressing member 70 to the intermediary transfer belt 31 is reduced, a degree to which the ratio Vo/Vb mentioned above is increased is reduced or the ratio Vo/Vb mentioned above is not changed. In this case, there could be a configuration in which the Vo/Vb mentioned above is reduced.

In addition, in the embodiment 1, the image forming apparatus 100 executed the variable control of the setting of the position of the pressing member 70 based on the information of the recording material P, and also executed the process of correcting the elongation (overall magnification) of the image with respect to the conveyance direction of the recording material P based on the setting of the position of the pressing member 70. However, the present invention is not limited to such a configuration. As mentioned above, when the setting of the position of the pressing member 70 is arbitrarily changed by an operator such as a user from the operating portion 120 or an external device, a process to correct the overall magnification of the image may be executed based on the setting of the position of the pressing member 70. The correction of the overall magnification of the image according to the position of the pressing member 70 itself may be the same as the embodiment 1. As a result, it becomes possible to suppress the change in the overall magnification of the image according to the position of the pressing member 70 arbitrarily set by an operator such as a user.

8. Effect

Thus, the image forming apparatus 100 in the embodiment 1 comprises the image forming portion 10 configured to form a toner image, the rotatable endless belt 31 on which the toner image is formed by the image forming portion 10, the plurality of stretching rollers configured to stretch the belt 31, and including the inner roller 32 and an upstream roller 35 disposed upstream of and adjacent to the inner roller 32 with respect to the rotational direction of the belt 31, the outer member 41 disposed opposite to the inner roller 32 and configured to form the transfer portion N2 transferring the toner image to the recording material P from the belt 31 by contacting the outer circumference surface of the belt 31, the pressing member 70 contactable to the inner circumferential surface of the belt 31 upstream of the inner roller 32 and downstream of the upstream roller 35 with respect to the rotational direction of the belt 31 and capable of pressing the belt 31 toward the outer circumferential surface side from the inner circumferential surface side, the moving mechanism 71 capable of changing at least one of the pressing amount of the pressing member 70 to the belt 31 and the contacting state or the separating state of the pressing member 70 to the belt 31 by changing the position of the pressing member 70, the control portion **802*c* configured to control the moving mechanism 71, and the correcting portion 802*d* executing correcting process to change the magnification of the toner image formed on the belt 31 by the image forming portion 10 with respect to the conveyance direction of the belt 31 based on the setting of the position of the pressing member 70 by the moving mechanism 71 when transferring the toner image from the belt 31 to the recording material P. In the embodiment 1, the correcting portion 802*d* executes the correcting process mentioned above so that the magnification mentioned above in a case where the setting of the position of the pressing member 70 is a second position where the pressing amount of the pressing member 70 to the belt 31 is larger than a first position is larger than the magnification mentioned above in a case where the setting of the position of the pressing member 70 is the first position. In the embodiment 1, in the correcting process mentioned above, the correcting portion 802*d* changes a length of the image data defining the toner image to be formed on the belt 31 by the image processing portion 10 with respect to the conveyance direction of the belt 31. In this case, the correcting portion 802***d* changes the length mentioned above so that the length mentioned above in a case where the setting of the position of the pressing member 70 is the second position where the pressing amount of the pressing member 70 to the belt 31 is larger than the first position is longer than the length mentioned above in a case where the setting of the position of the pressing member 70 is the first position. In addition, in the embodiment 1, the image forming portion 10 has a rotatable image bearing member 11 and the exposure device 13 for forming an electrostatic image on the image bearing member 11, which includes a light source and the rotatable polygon mirror 13*a* that reflects light from the light source toward the image bearing member 11. In this case, the correcting portion 802*d* can change the rotational speed of the polygon mirror 13*a* in the correcting process mentioned above. In addition, in this case, the correcting portion 802*d* can change the rotational speed mentioned above so that the rotational speed mentioned above in a case where the setting of the position of the pressing member 70 is the second position where the pressing amount of the pressing member 70 to the belt 31 is larger than the first position is slower than the rotational speed mentioned above in a case where the setting of the position of the pressing member 70 is the first position.

In addition, the image forming apparatus 100 may be configured to include a belt driving portion 201 configured to drive the belt 31, an outer member driving portion 202 configured to drive the rotatable outer member 41, and the correcting portion 802*d* configured to execute the correcting process to change at least one of the dri ving speed of the belt 31 by the belt driving portion 201 or the driving speed of the outer member 41 by the outer member driving portion 202 when transferring the toner image based on the setting of the position of the pressing member 70 by the moving mechanism 71 when transferring the toner image from the belt 31 to the recording material P. In this case, the correcting portion 802*d* can execute the correcting process mentioned above so that the driving speed of the belt 31 in a case where the setting of the position of the pressing member 70 is the second position where the pressing amount of the pressing member 70 to the belt 31 is larger than the first position is slower than the driving speed of the belt 31 in a case where the setting of the position of the pressing member 70 is the first position. In addition, the correcting portion 802*d* can perform the correcting process mentioned above so that the driving speed of the outer member 41 when the setting of the position of the pressing member 70 is the second position, where the pressing amount of the pressing member 70 to the belt 31 is larger than the first position, is faster than the driving speed of the outer member 41 when the setting of the position of the pressing member 70 is the first position. In addition, the correcting portion 802*d* can change the ratio Vo/Vb between the driving speed of the belt 31 Vb and the driving speed of the outer member 41 Vo in the correcting process mentioned above. In this case, the correcting portion 802*d* can change the ratio Vo/Vb so that the ratio Vo/Vb mentioned above in a case where the setting of the position of the pressing member 70 is the second position where the pressing amount of the pressing member 70 to the belt 31 is larger than the first position is larger than the ratio Vo/Vb mentioned above in a case where the setting of the position of the pressing member 70 is the first position.

In addition, in the embodiment 1, the image forming apparatus 100 includes a first storage portion 804*a* that stores the information indicating the relationship between the information about the recording material P onto which the toner image is transferred and the setting of the position of the pressing member 70 and a second storage portion 804*b* that stores the information indicating the relationship between the setting of the position of the pressing member 70 and the changing amount in the correction process mentioned above, and the control unit 802*c* changes the position of the pressing member 70 according to the recording material P onto which the toner image is transferred based on the information stored in the first storage portion 804*a*, and the correcting portion 802*d* executes the correcting process mentioned above according to the setting of the position of the pressing member 70 based on the information stored in the second storage portion 804*b*.

As explained above, according to the embodiment 1, it is possible to suppress the changes in the image elongation (overall magnification) with respect to the conveyance direction of the recording material P by changing the position of the pressing member 70 that contacts the inner circumferential surface of the intermediary transfer belt 31 upstream of the secondary transfer portion N2.

[Other]

As described above, the present invention was described based on the specific embodiments, but the present invention is not limited to the examples described above.

In the embodiments described above, the outer roller in direct contact with the outer circumference surface of the intermediary transfer belt was used as an outer member forming the secondary transfer portion together with the inner roller as an inner member. In contrast to this, there could be a configuration in which the outer roller and the secondary transfer belt (secondary transfer outer belt) stretched between the outer roller and other rollers is used as an outer member. Then, for example, the outer roller can be made to contact the outer circumferential surface of the intermediary transfer belt via the secondary transfer belt. In other words, the secondary transfer device may be configured to include the secondary transfer outer belt between the secondary transfer outer roller and the intermediary transfer belt. In this configuration, the secondary transfer portion is formed by nipping the intermediary transfer belt and the secondary transfer belt between the inner roller that contacts the inner circumferential surface of the intermediary transfer belt and the outer roller that contacts the inner circumferential surface of the secondary transfer belt. In this case, a contact portion between the intermediary transfer belt and the secondary transfer belt is the secondary transfer portion (secondary transfer nip).

In addition, the image forming apparatus may be configured so that the intermediary transfer belt and the pressing member are in contact when transferring the toner image onto a rigid recording material such as thick paper or coated paper, and the pressing member is retracted from the intermediary transfer belt when transferring the toner image onto other recording materials.

In addition, the moving mechanism is not limited to the configuration in the embodiment described above, but any configuration that can change the position of the pressing member can be used. In the embodiment 1, the moving mechanism was configured to rotate the pressing member, but the moving mechanism can be configured with a moving portion that is movable to move the pressing member in the direction of pressing the intermediary transfer belt and in the opposite direction. For example, the moving mechanism may be configured to be able to change the position (more specifically, the tip position) of the pressing member by linearly moving the pressing member back and forth (sliding movement).

In addition, the moving mechanism is not limited to using the actuator that actuates the moving portion by a cam, but may also use, for example, an actuator that actuates the moving part by a solenoid.

In addition, in the embodiment 1, the pressing member is described as being composed of the flexible flat sheet member, but the present invention is not limited to that configuration. For example, the pressing member may be configured to include a contact member that contacts the intermediary transfer belt upstream of the secondary transfer portion and an elastic member such as a spring and urges the intermediary transfer belt elastically. For example, there could be a configuration in which the intermediary transfer belt is urged elastically by the contact member formed of relatively rigid sheet metal by urging the contact member with an elastic member (urging member) constituted of a compression coil spring, tensile spring, etc. In this case, the moving mechanism can be configured to move the pressing member constituted of the contact member and the elastic member (e.g., by moving the elastic member). The contact member can be, for example, a roller formed of an elastic member such as a sponge or rubber, or a roller formed of a rigid member such as resin or metal. Provided, it is preferable that the pressing member be made of a flat sheet material, since it is easier to place the pressing member in sufficient proximity to the secondary transfer portion. In addition, the pressing member can be made of a thin metal sheet, etc., however, from the viewpoint of suppressing wear of the intermediary transfer belt and leakage of the transfer current, it is preferable that the pressing member be made of a resin material.

In addition, although in the embodiment 1, a case in which the belt-shaped image bearing member is the intermediary transfer belt is described, the present invention can be applied to any image bearing member constituted of an endless belt that conveys the toner image borne at the image forming position. Examples of such belt-shaped image bearing members may include a photosensitive member belt and an electrostatic recording dielectric member belt, in addition to the intermediary transfer belt in the embodiments described above.

In addition, the invention can also be carried out also in other embodiments in which a part or all of the configurations of the embodiments described above are replaced with alternative configurations thereof. Accordingly, when the image forming apparatus using the belt-shaped image bearing member is used, the present invention can be carried out with no distinction as to tandem type/single drum type, a charging method, an electrostatic image forming method, a developing method, a transfer method and a fixing method. In the embodiments described above, a principal part related to the toner image formation/transfer was described principally, but the present invention can be carried out in various uses such as printers, various printing machines, copiers, facsimile machines and multi-function machines by adding necessary devices, equipment and a casing structure.

According to the present invention, changes in the elongation of the image with respect to the transfer direction of the recording material can be suppressed by changing the position of the pressure member that contacts the inner circumferential surface of the belt upstream of the transfer section.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-054621 filed on Mar. 29, 2022, which is hereby incorporated by reference herein in its entirety.

What is claimed is:

1. An image forming apparatus comprising:
- an image forming portion configured to form a toner image;
- a rotatable endless belt configured to bear the toner image formed by the image forming portion;
- a plurality of stretching rollers configured to stretch the belt, and including an inner roller and an upstream roller disposed upstream of and adjacent to the inner roller with respect to a rotational direction of the belt;
- an outer member disposed opposite to the inner roller via the belt and configured to form a transfer portion transferring the toner image to a recording material from the belt by contacting an outer circumferential surface;
- a pressing member contactable to an inner circumferential surface of the belt upstream of the inner roller and downstream of the upstream roller with respect to the rotational direction of the belt and capable of pressing the belt toward an outer circumferential surface side from an inner circumferential surface side;
- a moving mechanism capable of changing a pressing amount of the pressing member to the belt or a contacting state and separating state of the pressing member to the belt by changing a position of the pressing member; and
- a control portion configured to control magnification of the toner image, to be formed on the belt by the image forming portion, with respect to a conveyance direction of the belt based on the position of the pressing member by the moving mechanism while the toner image is transferred to the recording material from the belt.

2. An image forming apparatus according to claim 1, wherein the control portion controls the magnification so that the magnification in a case in which the position of the pressing member is set to a second position becomes higher than the magnification in a case in which the position of the pressing member is set to a first position, and
- wherein a pressing amount of the pressing member to the belt is a first pressing amount in the case in which the pressing member is in the first position, and the pressing amount of the pressing member to the belt is a second pressing amount greater than the first pressing amount in the case in which the pressing member is in the second position.

3. An image forming apparatus according to claim 1, wherein the control portion controls the magnification so that the magnification in a case in which the position of the pressing member is set to a second position becomes higher than the magnification in a case in which the position of the pressing member is set to a first position, and
- wherein the pressing member is separated from the belt in the case in which the pressing member is in the first position, and the pressing member presses the belt in the case in which the pressing member is in the second position.

4. An image forming apparatus according to claim 1, wherein the control portion controls the magnification by correcting image data defining the toner image to be formed on the belt by the image forming portion.

5. An image forming apparatus according to claim 1, wherein the image forming portion includes a rotatable image bearing member and an exposing device provided with a light source and a rotatable polygon mirror configured to reflect light from the light source toward the image bearing member, and wherein the control portion changes the magnification by changing a rotational speed of the polygon mirror.

6. An image forming apparatus according to claim 5, wherein the control portion changes the rotational speed so that the rotational speed in a case in which the position of the pressing member is in a second position becomes slower than the rotational speed in a case in which the position of the pressing member is in a first position, and wherein a pressing amount of the pressing member to the belt is a first pressing amount in the case in which the pressing member is in the first position, and the pressing amount of the pressing member to the belt is a second pressing amount greater than the first pressing amount in the case in which the pressing member is in the second position.

7. An image forming apparatus according to claim 1, wherein the outer member is provided with a secondary transfer belt, and an outer roller disposed opposite to the inner roller via the secondary transfer belt and configured to form the transfer portion in co-operation with the inner roller, and wherein a hardness of the inner roller is higher than that of the outer roller.

8. An image forming apparatus according to claim 1, further comprising:

a first memory portion configured to store information on a relationship between information of the recording material to which the toner image is to be transferred and the position of the pressing member; and a second memory portion configured to store information on a relationship between the position of the pressing member and the magnification, wherein the control portion changes the position of the pressing member according to the recording material to which the toner image is to be transferred based on the information stored in the first memory portion, and wherein the control portion changes the magnification according to the position of the pressing member based on the information stored in the second memory portion.

9. An image forming apparatus according to claim 1, wherein when, with respect to a circumferential direction of the belt, an area where the belt and the outer member contact and the inner roller and the belt do not contact is defined as a tension nip area, a length of the tension nip area is a first length in a case of the pressing member being in a first position and a second length longer than the first length in a case of the pressing member being in a second position.

10. An image forming apparatus according to claim 9, wherein the outer member is provided with a secondary transfer belt, and an outer roller disposed opposite to the inner roller via the secondary transfer belt and configured to form the transfer portion in co-operation with the inner roller, and wherein the secondary transfer belt is in contact with the outer roller in the tension nip area.

11. An image forming apparatus comprising:

an image forming portion configured to form a toner image;

a rotatable endless belt configured to bear the toner image;

a belt driving portion configured to drive the belt;

a plurality of stretching rollers configured to stretch the belt, and including an inner roller and an upstream roller disposed upstream of and adjacent to the inner roller with respect to a rotational direction of the belt;

an outer member disposed opposite to the inner roller via the belt and configured to form a transfer portion transferring the toner image to a recording material from the belt by contacting an outer circumferential surface;

an outer member driving portion configured to drive the outer member;

a pressing member contactable to an inner circumferential surface of the belt upstream of the inner roller and downstream of the upstream roller with respect to the rotational direction of the belt and capable of pressing the belt toward an outer circumferential surface side from an inner circumferential surface side;

a moving mechanism capable of changing a pressing amount of the pressing member to the belt or a contacting and separating state of the pressing member to the belt by changing a position of the pressing member; and a control portion configured to control a ratio of a driving speed of the outer roller to a driving speed of the belt while the toner image is transferred to the recording material from the belt based on the position of the pressing member by the moving mechanism while the toner image is transferred to the recording material from the belt.

12. An image forming apparatus according to claim 11, wherein the control portion controls the ratio so that the ratio in a case in which the position of the pressing member is in a second position becomes higher than the ratio in a case in which the position of the pressing member is in a first position, and wherein a pressing amount of the pressing member to the belt is a first pressing amount in the case in which the pressing member is in the first position, and the pressing amount of the pressing member to the belt is a second pressing amount greater than the first pressing amount in the case in which the pressing member is in the second position.

13. An image forming apparatus according to claim 12, wherein the control portion changes the ratio by changing the driving speed of the outer member.

14. An image forming apparatus according to claim 11, wherein the outer member is provided with a secondary transfer belt, and an outer roller disposed opposite to the inner roller via the secondary transfer belt and configured to form the transfer portion in co-operation with the inner roller, and wherein a hardness of the inner roller is higher than that of the outer roller.

15. An image forming apparatus according to claim 11, further comprising:

a first memory portion configured to store information on a relationship between information of the recording material to which the toner image is to be transferred and the position of the pressing member; and a second memory portion configured to store information on a relationship between the position of the pressing member and the speed ratio, wherein the control portion changes the position of the pressing member according to the recording material to which the toner image is to be transferred based on the information stored in the first memory portion, and wherein the control portion changes the speed ratio according to the position of the pressing member based on the information stored in the second memory portion.

16. An image forming apparatus according to claim 11, wherein when, with respect to a circumferential direction of the belt, an area where the belt and the outer member contact and the inner roller and the belt do not contact is defined as a tension nip area, a length of the tension nip area is a first length in a case of the pressing member being in a first position and a second length longer than the first length in a case of the pressing member being in a second position.

17. An image forming apparatus according to claim 16, wherein the outer member is provided with a secondary transfer belt, and an outer roller disposed opposite to the inner roller via the secondary transfer belt and configured to form the transfer portion in co-operation with the inner roller, and wherein the secondary transfer belt is in contact with the outer roller in the tension nip area.

* * * * *